(12) United States Patent
Ferris et al.

(10) Patent No.: US 8,831,160 B2
(45) Date of Patent: Sep. 9, 2014

(54) METHOD AND APPARATUS FOR SWITCHING CLOCK FREQUENCY IN A SYSTEM-IN-PACKAGE DEVICE

(71) Applicants: STMicroelectronics (Research & Development) Limited, Marlow (GB); STMicroelectronics (Grenoble 2) SAS, Grenoble (FR)

(72) Inventors: Andrew Ferris, Bristol (GB); Ignazio Antonino Urzi, Voreppe (FR)

(73) Assignees: STMicroelectronics (Research & Development) Limited, Marlow, Buckinghamshire (GB); STMicroelectronics (Grenoble 2) SAS, Grenoble (FR)

( * ) Notice: Subject to any disclaimer, the term of this patent is extended or adjusted under 35 U.S.C. 154(b) by 31 days.

(21) Appl. No.: 13/744,146

(22) Filed: Jan. 17, 2013

(65) Prior Publication Data

US 2013/0195235 A1 Aug. 1, 2013

(30) Foreign Application Priority Data

Jan. 30, 2012 (GB) .................................. 1201530.1

(51) Int. Cl.
*H04L 7/04* (2006.01)
*G06F 1/10* (2006.01)
*G06F 1/08* (2006.01)
*H04L 7/00* (2006.01)

(52) U.S. Cl.
CPC .. *H04L 7/00* (2013.01); *G06F 1/10* (2013.01); *H04L 7/0083* (2013.01); *H04L 7/0004* (2013.01); *G06F 1/08* (2013.01); *H04L 7/0008* (2013.01)

USPC ........... 375/362; 375/215; 375/295; 375/309; 375/354; 375/377

(58) Field of Classification Search
CPC ....... H04L 7/00; H04L 7/0004; H04L 7/0008; H04L 7/0083; H04N 19/00478; H04N 19/00484; H04N 19/00781; H04N 19/00951; H04N 19/00121; H04N 19/00533; H04N 19/00775; H04N 19/00884; H04B 7/18532; H03K 19/0013
USPC ......... 375/215, 286, 295, 306, 309, 326, 339, 375/354, 362, 377
See application file for complete search history.

(56) References Cited

U.S. PATENT DOCUMENTS 3,594,656 A   7/1971  Tsukamoto
5,357,146 A * 10/1994  Heimann ...................... 327/292

(Continued)

FOREIGN PATENT DOCUMENTS

JP    2003131754 A   5/2003
WO   WO-9906543 A1   2/1999

OTHER PUBLICATIONS

UKIPO Search Report for GB1201530.1 mailed May 16, 2012, with Corrected Citation Pages (6 pages).

*Primary Examiner* — Hirdepal Singh
(74) *Attorney, Agent, or Firm* — Gardere Wynne Sewell LLP

(57) ABSTRACT

An apparatus includes a first clock source, a second clock source and circuitry configured to supply a clock signal to a circuit. The circuitry operates to change the clock signal from one frequency to another different frequency. This change is made in a manner whereby no clock signal is supplied during a period of time when the change from the one frequency to the another different clock frequency is being made.

27 Claims, 13 Drawing Sheets

(56) References Cited

U.S. PATENT DOCUMENTS

| | | | |
|---|---|---|---|
| 6,088,255 A | 7/2000 | Matsuzaki et al. | |
| 6,201,448 B1 | 3/2001 | Tam et al. | |
| 6,452,426 B1 * | 9/2002 | Tamarapalli et al. | 327/99 |
| 6,483,888 B1 * | 11/2002 | Boerstler et al. | 377/47 |
| 7,467,320 B2 * | 12/2008 | Chang et al. | 713/501 |
| 7,656,980 B2 * | 2/2010 | Matsumuro et al. | 375/354 |
| 7,729,415 B1 * | 6/2010 | Possley | 375/219 |
| 8,217,697 B2 * | 7/2012 | Satterfield | 327/291 |
| 8,375,239 B2 * | 2/2013 | Nara et al. | 713/400 |
| 2004/0012435 A1 * | 1/2004 | Meguro | 327/408 |
| 2007/0291828 A1 * | 12/2007 | Martin et al. | 375/219 |
| 2008/0307240 A1 * | 12/2008 | Dahan et al. | 713/320 |
| 2009/0154268 A1 | 6/2009 | Kinugasa et al. | |
| 2011/0140789 A1 * | 6/2011 | Kumar | 331/18 |
| 2011/0225341 A1 * | 9/2011 | Satoh et al. | 710/314 |
| 2012/0306558 A1 * | 12/2012 | Singvall et al. | 327/298 |
| 2013/0083611 A1 * | 4/2013 | Ware et al. | 365/191 |
| 2013/0129114 A1 * | 5/2013 | Lesso | 381/98 |

* cited by examiner

METHOD AND APPARATUS FOR SWITCHING CLOCK FREQUENCY IN A SYSTEM-IN-PACKAGE DEVICE

PRIORITY CLAIM

The present application claims priority from Great Britain Application for Patent No. 1201530.1 filed Jan. 30, 2012, the disclosure of which is incorporated by reference.

TECHNICAL FIELD

The present invention relates to a method and an arrangement and in particular but not exclusively to a method and arrangement for use when a clock frequency is changed.

BACKGROUND

In known circuits, a clock frequency is sometimes changed from one value to another. This can cause problems of, for example, clock glitches and skewing. This may be problematic when data is being clocked using the changing clock.

SUMMARY

In an embodiment, an apparatus comprises: a first clock source; a second clock source; and circuitry configured to supply a clock signal to a circuit, said circuitry configured to change the clock signal from one frequency to another different frequency such that no clock signal is supplied when changing from said one frequency to a said another different clock frequency.

In an embodiment, an apparatus comprises: a transmit physical interface including a data output and a clock output which is a timing reference for the data output; a first oscillating circuit configured to generate a first clock signal having a variable frequency; and a second oscillating circuit configured to generate a second clock signal at a fixed frequency. A control circuit is configured to control operation of the transmit physical interface during a change in frequency of the clock output, said control circuit operable to: terminate transmit physical interface data output with the clock output derived from the first clock signal; activate transmit physical interface data output with the clock output derived from the second clock signal; change frequency of the first clock signal; terminate transmit physical interface data output with the clock output derived from the second clock signal; and activate transmit physical interface data output with the clock output derived from the first clock signal at the changed frequency.

In an embodiment, a method comprises: transmitting data output from a transmit physical interface with a clock output derived from a first clock signal having a variable frequency; and in response to a need to change a frequency of the clock output: terminating transmission of data output from the transmit physical interface with the clock output derived from the first clock signal; activating transmission of data output from the transmit physical interface with the clock output derived from a second clock signal having a fixed frequency; changing a frequency of the first clock signal; terminating transmission of data output from the transmit physical interface data output with the clock output derived from the second clock signal; and activating transmission of data output from the transmit physical interface data output with the clock output derived from the first clock signal at the changed frequency.

BRIEF DESCRIPTION OF THE DRAWINGS

For an understanding of some embodiments, reference is made by way of example only to the accompanying Figures in which.

DETAILED DESCRIPTION OF THE DRAWINGS

Figure 1:
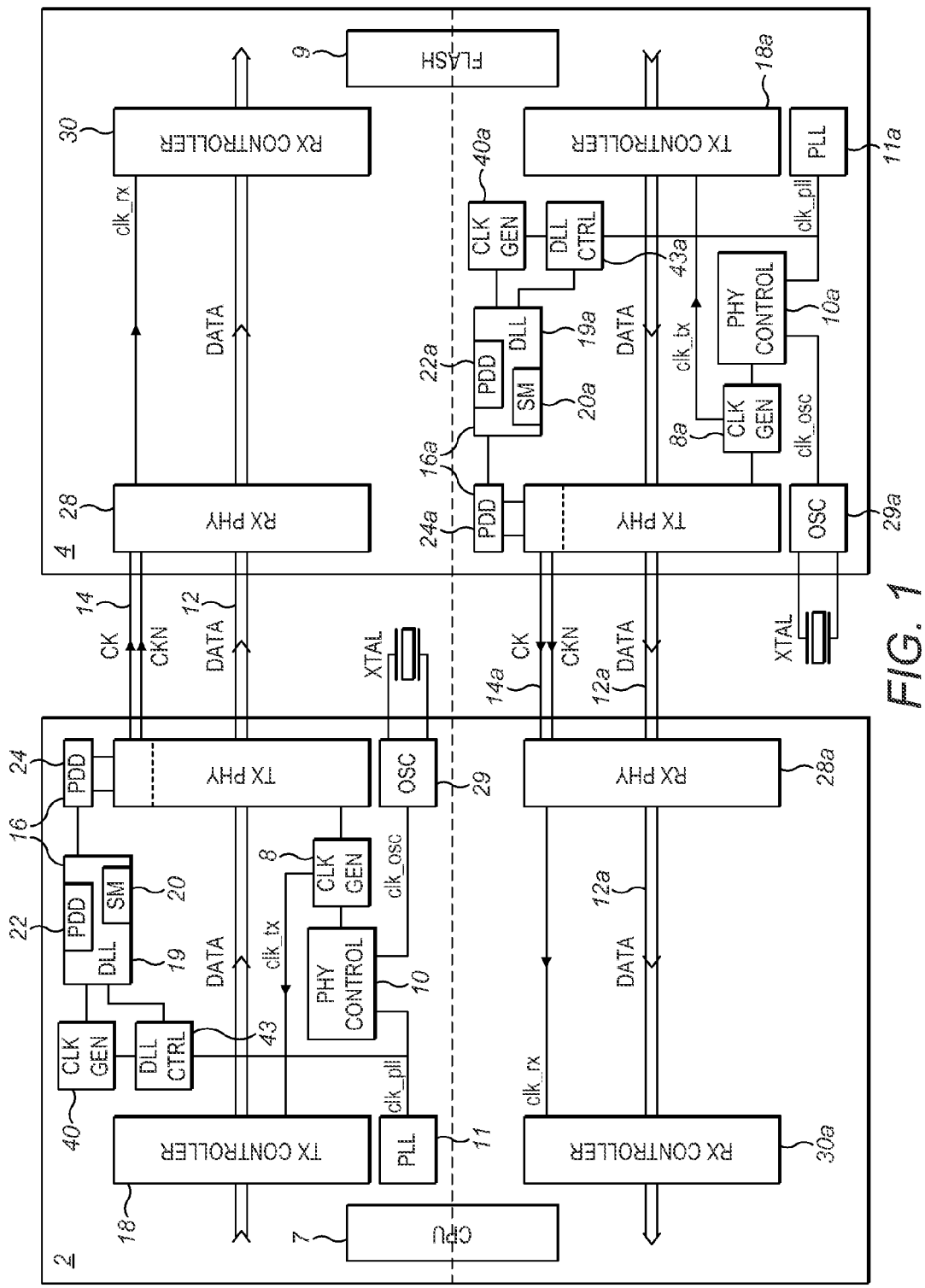
FIG. 1 shows a first die and a second die.

Some embodiments may be used where there are more than one die within a single package. In particular, a plurality of integrated circuit dies may be incorporated within a single package. In the following examples, FIG. 1 shows a single System-in-Package having two dies which is provided to explain in detail the interaction between two dies. However it is appreciated that three or more dies may be provided in some embodiments in the same single package.

The rationale for the increasingly common usage of two, or more, separate die in a single System-in-Package (SiP) follows:

The decreasing feature size in CMOS silicon processes allows digital logic to shrink significantly in successive fabrication technology. For example, an area shrink of approximately 50% may be obtained when comparing a digital logic cell implemented in 90 nanometer technology with a digital logic cell implemented in 65 nanometer technology. However, analog and input/output cells tend to shrink much less if at all in these implementations. This may lead to increasingly pad limited designs in many complex system-on-chips (SoC). A pad limited design can be considered wasteful if the digital logic is not implemented as densely as it might be if it were the determining factor in the device area.

Another factor in some embodiments is that the transition, for example, to a sub 32 nanometer design may introduce a dichotomy between supporting low voltage, high speed input/output logic such as DDR3 (Double Data Rate) RAM (Random Access Memory) 1.5 V @ 800 MHz or higher on the one hand and higher voltage interconnect technologies, for example HDMI (High Definition Multimedia Interface), SATA (Serial Advanced Technology Attachment), USB3 (Universal Serial Bus), etc. on the other hand. The lower voltage DDR3 interface may require a lower transistor gate oxide thickness as compared to the HDMI technology. This may be incompatible within a standard process.

Porting of high speed analog interfaces to a new process consumes a lot of resource in terms of time and expert attention. By decoupling the implementation of analog blocks from that of digital blocks of the system may allow a reduction in time to working silicon.

By splitting a traditional monolithic system-on-chip into a plurality of dies in order to form a System-in-Package comprising two or more dies, advantages can be achieved. For example, each die may be designed to provide a particular function which may require various different mixes of analog and digital circuitry in the implementation of the particular function. This means that in some embodiments, it may be possible to use the same die or same design for a die in a different System-in-Package. This modularity may reduce design time.

Embodiments may be used where there are two or more dies in the package. Embodiments may be used alternatively or additionally where the dies are manufactured in different technologies. Embodiments may be used alternatively or additionally where it is advantageous for at least one of the dies to be certified, validated or tested independently for conformance to, for example, a standard. Embodiments may alternatively or additionally be used where one of the dies contains special purpose logic to drive specific wireless, optical or electrical interfaces so that the other die or dies can be manufactured independently and not incur any costs associated with the special purpose logic. Embodiments may alternatively or additionally be used where one of the dies contains information, for example encryption information, which is to be withheld from the designers/manufacturers of the other die or dies. Embodiments may alternatively or additionally be used where one of the dies contains high density RAM (Random Access Memory) or ROM (Read Only Memory) and it is preferable to separate this from standard high speed logic for reasons of fabrication yield and/or product flexibility.

It should be appreciated that some embodiments may have additional or alternative advantages other than those discussed previously.

Some embodiments may have particular relevance to a two (or more) die system. However, it should be appreciated that embodiments may be implemented in scenarios other than the two or more die system. For example, some embodiments may be used to facilitate the function of two or more blocks. Those blocks may be part of a same integrated circuit, part of a same die, on different integrated circuits or any other suitable arrangement.

FIG. 1 shows a first die 2 and a second die 4. In FIG. 1, by way of example only, the first die 2 has CPU 7. The second die 4 has a flash memory 9. This flash memory contains boot code which is required by the CPU for booting the system. In embodiments, the two dies are required to run during boot at a frequency determined by an oscillator 29 (oscillator mode) and then switch to a higher operational frequency determined by a phase lock loop PLL 11 (PLL mode). This is because the CPU 7 may boot from the flash memory 9 located on the die remote from that containing the CPU 7. Thus, the interface between the two dies needs to be functional during this boot period.

The interface may run at a frequency which is half the clock of the interface. This means that in the oscillator mode, the interface runs at half the oscillator frequency. Similarly in the PLL mode, the interface may run at half the PLL frequency.

In some embodiments on-the-fly change in frequency is 'invisible' to the overall system. This means that no handshaking with the system-on-chip may be required. Also problems such as clock glitches and/or clock skewing may be avoided.

Each die has a transmitter and receiver and accordingly will incorporate both the transmitting and receiving circuitry, allowing two-way communication between the die as needed, for example, die 1 accessing and receiving data from the flash memory located in die 2. It will be appreciated that this is one function of the interface, and there may be one or more other uses in the full operation of the SiP.

The first die 2 has a transmitter physical interface (TX PHY) 6 and a transmitter controller (TX CONTROLLER) 18. The transmitter physical interface 6 has an associated control circuit 10 and clock generator 8. The controller 18 is arranged to provide data 12 that is propagated through the transmitter physical interface 6 to the second die 4. The transmitter physical interface 6 is configured to provide a clock signal 14 to accompany the data. This clock is shown in FIG. 1 in a preferred embodiment as a differential pair, CK and CKN. The clock can be considered as a timing reference for the data as clock and data are transmitted across the interface between the two die.

The first die also has associated delay locked-loop (DLL) circuitry 16 consisting of a main DLL function 19, containing a master programmable digital delay line (PDD) 22 and a controlling state machine (SM) 20. The DLL circuitry comprises a slave PDD coupled to the transmitter physical interface 6. In some embodiments, the slave PDD 24 is connected directly to the transmitter physical interface 6. The adjustment of the magnitude of the delay through the slave PDD 24 may be used to accurately control the phase of the CK/CKN differential clock pair with respect to the transmitted data when the interface is operating at high speed.

The control circuit 10 and the role of the DLL circuitry 16 will be described in more detail later.

The second die 4 may also comprise the same transmitter circuitry components albeit implemented in the technology of that die. These components are marked with the same reference number but suffixed with "a".

The second die 4 comprises a receiver physical interface (RX PHY) 28 and a receiver controller (RX CONTROLLER) 30. The receiver physical interface 28 is configured to receive the data stream 12, and the differential clock signal pair 14. The receiver physical interface 28 is configured to capture the data stream with a clock derived from the differential pair CK/CKN 14 and to propagate the data to the controller 30.

The first die 2 may also comprise the same receiver circuitry components albeit implemented in the technology of that die. These components are marked with the same reference number but suffixed with "a". The PLL provides a clock signal clk_pll to the control circuit 10 and to a DLL controller 43. The oscillator 29 provides a clock signal clk_osc to the transmitter control circuit 10.

As mentioned, the interface may need to operate during the boot phase of the SiP at a frequency determined by the oscillator 29, in order to fetch data from the flash 9 on the second die to the CPU 7 on the first die. By way of example only the oscillator frequency typically may be of the order of 30 MHz and the interface operates at half that frequency.

During the boot period the systems on-chip are brought to their operational state including the PLL 11 which will be the clock source of the interface during normal operation. At the end of the boot period the SiP needs to switch the interface to its operating frequency, determined by the PLL, during which the interface may operate at speeds of for example 400 MHz. This corresponds to a PLL frequency of 800 MHz. This increase in frequency, of over an order of magnitude, may be managed by transmitter control circuit 10.

At other times, the interface between the two dies may be operated at a different operational frequency determined by the PLL. For example, the interface and/or one or more of the dies may be run at a reduced frequency for bandwidth optimization or power saving.

To achieve such frequency changes, the interface will transition through a period at the frequency determined by the oscillator, during which the PLL is reconfigured. To achieve a change of operating frequency the interface is stopped and then restarted at the frequency determined by the oscillator. The PLL is reconfigured to the new speed while the interface operates at the frequency determined by the oscillator and then allowed to re-achieve lock. When both the PLL and the DLL have re-achieved lock the interface is again stopped and then restarted at the frequency determined by the new PLL frequency. In some embodiments, at the relatively slow oscillator speed, the phase accuracy of the differential clock CK/CKN provided by the DLL is not required.

It should be appreciated that the ability to switch between different operational PLL speeds makes the arrangement applicable to single systems, where such switching may be required, as well as to the SiP embodiments using two or more dies.

Figure 2:
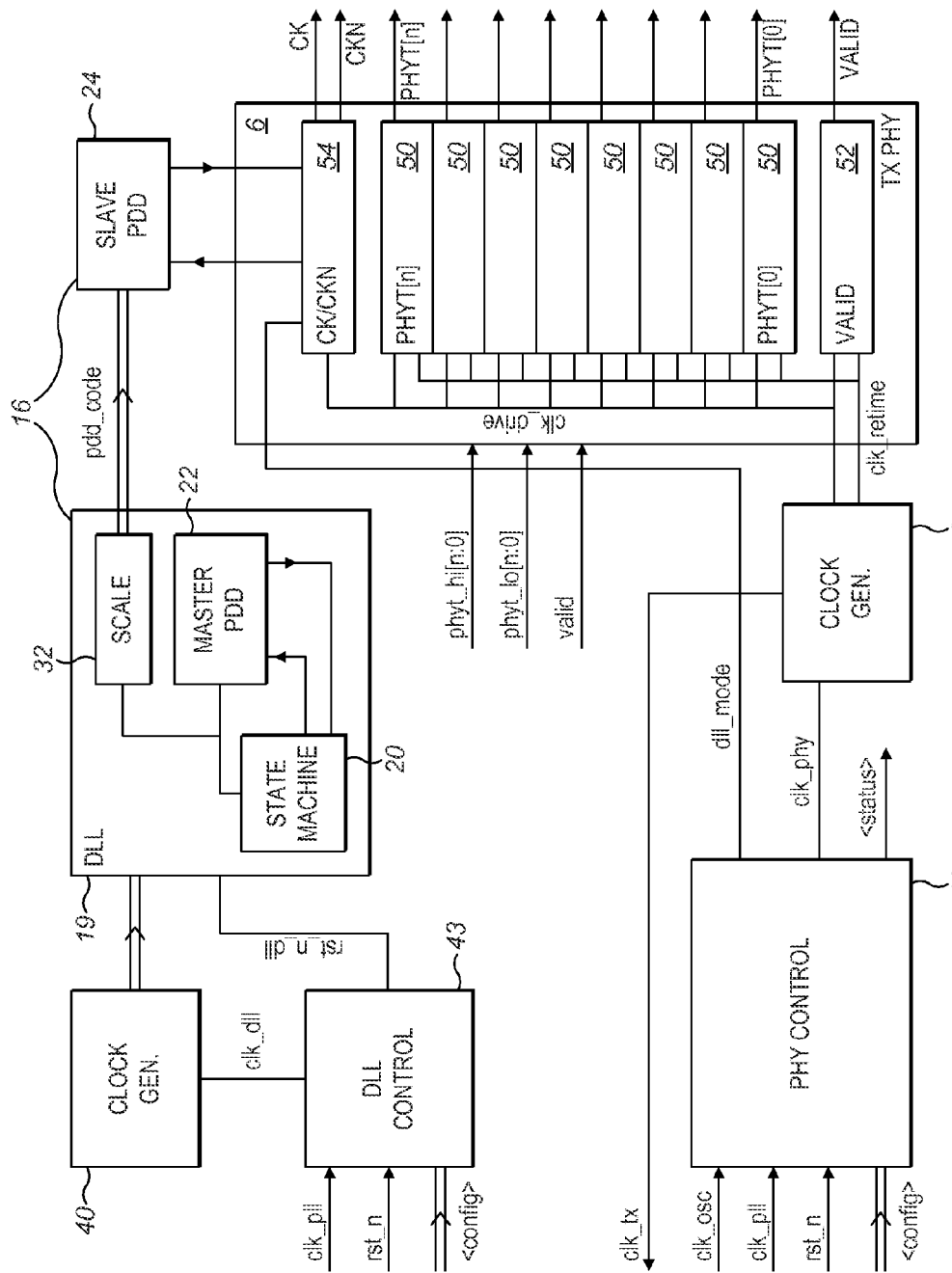
FIG. 2 shows the part of the transmitter physical interface and associated circuitry in more detail.

Reference is now made to FIG. 2 which shows the transmitter physical interface 6 and associated circuitry of the first die in more detail. It should be appreciated that the same or similar circuitry shown in FIG. 2 is present on the second die associated with its transmitter physical interface.

As can be seen the transmitter physical interface 6 is configured to receive data from the controller 18 (not shown in FIG. 2) in two streams phyt_hi and phyt_lo. In the embodiment shown, each stream comprises bits 0 to n. The data streams are received by the transmitter physical interface 6 which combines the data into a single stream PHYT by transmitting data on the rising and falling edges of the differential clock pair CK/CKN. In this embodiment data is converted from two single-clock-edge (SCE) streams to a single double-clock-edge (DCE) stream. Other embodiments may have one SCE stream which is propagated in that format without conversion to the receiver physical interface. Alternative embodiments may have started with a DCE stream which is propagated in that format without conversion. Of course any other suitable method of data propagation can be used.

The receiver physical interface 28 on the second die captures and converts the DCE stream back into two SCE streams which are then propagated to the receiver controller 30. The transmitter controller 18 also provides a valid signal to the transmitter physical interface 6. The transmitter physical interface 6 is configured to send a valid signal VALID to the second die. In some embodiments, the valid signal may not be required.

The control circuit 10 is configured to receive a clock signal clk_pll from the PLL and a clock signal clk_osc from the oscillator. The control circuit 10 generates a clock output clk_phy that is used as a source for the clock generator 8. The clock generator 8 generates the clocks for the transmitter physical interface 6. It should be appreciated that clk_phy runs at the same speed or is determined by clk_pll during normal operation and at the same speed or is determined by clk_osc during the oscillator or boot phase.

The control circuit 10 is also configured to receive a system reset signal rst_n and one or more configuration inputs. The control circuit 10 generates a status signal and a DLL mode signal dll_mode. These signals will be described later.

The clock generator 8 generates a clock signal clk_retime and clock signal clk_drive that is used to control the propagation of the data and valid signal through the transmitter physical interface. The clock signal clk_drive is used in the differential clock CK/CKN generation. The clock generator 8 is configured to provide an output clock tx_clk which is provided to the controller 18 as shown in FIG. 1. This clock signal is used by the controller to control the clocking of the phyt_hi and phyt_lo data streams.

The DLL circuitry is used to change the phase of the differential clock signal CK/CKN when the SiP is run at high speed determined by the PLL frequency. The state machine 20 of the DLL circuitry compares the phase of an input clock (with the same frequency as CK/CKN) to a version of the same clock inverted and routed through the master PDD 22. The state machine 20 then adjusts the code that controls the master PDD delay until the two clocks are aligned. This code then corresponds to a half period of CK/CKN and maintains this PDD delay irrespective of process, voltage and temperature (PVT). A scale circuit 32 of the DLL 19 can be configured to provide a code to the slave PDD 24 that corresponds to any proportion of the half period. The delay through the slave PDD determines the phase of CK/CKN. For example the default delay in this system is configured to be a quarter period of CK/CKN which allows the clock to be positioned in the nominal center of the data windows at the interface between the first and second die. The choice of the position of the clock relative to data may be selected as required. For example in one embodiment, the clock relative to the data may be in the central region of the data window. This may minimize coupling from the data switching, reduce clock jitter, and/or be in the optimal position for capturing data without having to further adjust the clock in the receiver physical interface.

The DLL may adjust the phase of CK/CKN from 0 to one half-period of CK/CKN in fine increments during a test mode. This is in order to determine the limits of the data windows by looking for the boundaries between pass and fail regions. In this way, for example, the impact of different packages on the noise/jitter performance of the interface can be examined. Alternatively a comparison of the size of the data windows between a SiP and two die in separate packages on a PCB can be made.

The DLL may thus adjust the phase of the differential clocks at high speed. The position of the differential clock signal may be determined using sequencing logic, which has a resolution of a quarter-cycle, when the interface is running at the slower frequency determined by the oscillator. This then provides the opportunity to reconfigure both PLL and DLL at this time by bypassing the slave PDD delay. This will be described in more detail with reference to FIG. 3.

The DLL 19 is controlled by a DLL control circuit 43. The DLL control circuit 43 provides a reset signal rst_n_dll to the DLL 19 and a clock signal clk_dll to a DLL clock generator 40. The DLL control circuit 43 is arranged to receive a system reset rst_n input for the DLL 19. The DLL control circuit 43 receives the PLL clock clk_pll and at least one configuration signal which will be described later.

The DLL clock generator 40 provides clock signals to the DLL 19.

The transmitter physical interface 6 comprises bit-slices, one slice 50 for each data bit, one slice 52 for the valid signal and one slice 54 for CK/CKN. Each bit slice receives the clock drive signal clk_drive and clock signal clk_retime output by the clock generator 8. The valid bit slice receives the valid signal. Each of the data bit slices will receive a respective data bit. The clock bit slice 54 is configured to receive an output from the slave PDD 24 and to provide an output to the slave PDD 24. The data bit-slices 50 are configured to receive the phyt_hi and phyt_lo data streams and to provide the single data output stream as previously described. The valid circuitry is configured to receive the valid signal and to provide a corresponding VALID signal to accompany the data stream.

Figure 3:
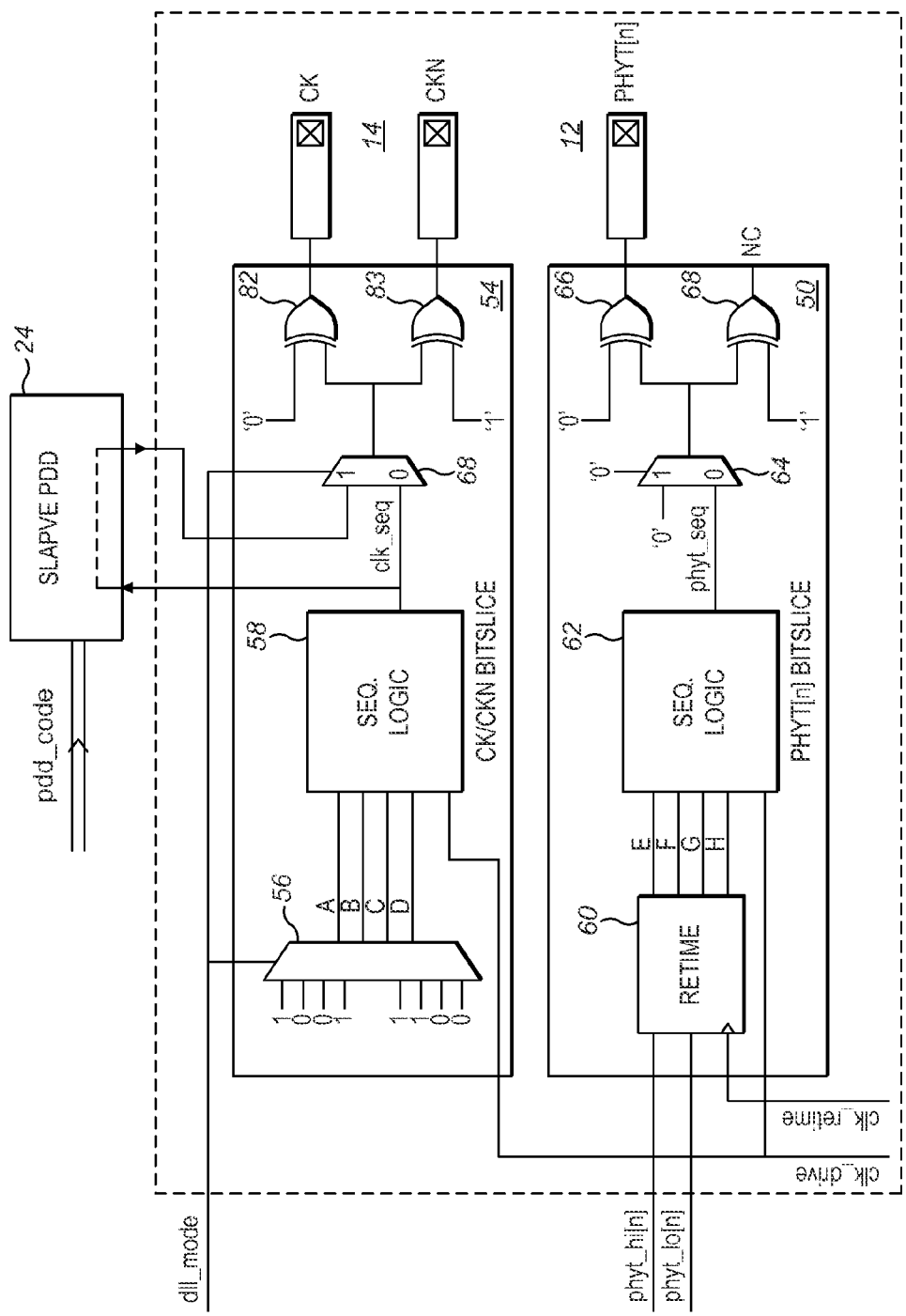
FIG. 3 shows in more detail the transmitter physical interface of FIGS. 1 and 2.

Reference is now made to FIG. 3 which shows part of the transmitter physical interface 6 in more detail. FIG. 3 shows detail of the CK/CKN bit-slice 54 and one data bit-slice 52 (for PHYT[n]). It should be noted that the data and valid bit-slices are the same. The structure of the CK/CKN bit-slice is similar. In some embodiments, this is to keep the data, valid and clock propagation aligned between bit-slices.

The CK/CKN bit-slice is arranged to provide a first clock signal CK and a clock signal CKN which provide the differential clock pair 14. These signals are propagated through pad circuits that drive the external die-to-die interface. The CK/CKN bit-slice comprises a first multiplexor 56. The first multiplexor 56 is configured to receive a first four bit input and a second four bit input. The first four bit input comprises the signal '1100'. This pattern is output by the multiplexor on signals ABCD when the signal dll_mode is '0'. The second four bit input comprises the signal '1001'. This pattern is output by the multiplexor on signals ABCD when dll_mode is '1'. The DLL mode signal is provided by the control circuit 10.

The signals ABCD are provided to a sequencing logic circuit 58 which is driven by the clock signal clk_drive. The clock signal clk_drive, which is the same speed as the PLL clock signal, clk_pll, runs at double the required speed of CK/CKN. For each successive period of the clock signal clk_drive the output of the sequencing logic is A then B then C then D then A and so on in a continual loop, Thus the output is a clock waveform with 50% duty cycle running at half the speed of clock signal clk_drive. This is the case regardless of the state of the DLL mode signal dll_mode. When the DLL mode signal dll_mode='1' the output waveform is advanced by one clock signal clk_drive period relative to when the DLL mode signal dll_mode='0' case. This advance is equal to one quarter of the differential clock CK/CKN period.

The CK/CKN bit-slice 54 comprises a second multiplexor 68. The second multiplexor 68 is also controlled by the DLL mode signal dll_mode. The '0' input of the multiplexor is provided by the output clk_seq of the sequencing logic. This output clock signal 58, clk_seq, is also input to the slave PDD 24. The other end or output of the slave PDD 24 provides the '1' input of the second multiplexor 68.

The slave PDD 24 is controlled by the code signal pdd_code which is received from the DLL 19. When the DLL mode signal dll_mode='0', the output of the sequence logic clk_seq is propagated directly through the '0' input of the second multiplexor 68. When the DLL mode signal dll_mode='1', the output of the sequence logic clk_seq is routed through the '1' input of the second multiplexor 68 via the slave PDD 24. When the value of the slave PDD delay is the default one quarter cycle of CK/CKN the output of the second multiplexor 68 has no net phase shift whether the DLL mode signal dll_mode is '0' or '1'. This is because the slave PDD 24 delay of a quarter-cycle is added to the advance of a quarter-cycle due to the first multiplexor 56. However when dll_mode='1' the route through the slave PDD provides the ability to finely adjust the phase of CK/CKN (with respect to the fixed phases of data and valid signals).

The output of the second multiplexor 68 is provided to a first XOR gate 82 and a second XOR gate 83. The first XOR gate 82 receives a second input from a '0' signal whilst the second XOR gate 83 receives a second input from a '1' signal. The output of the first XOR gate 82 provides the first clock signal CK whilst the output of the second XOR gate 83 provides the second clock signal CKN. The use of the XOR gates to generate the differential clock signals may balance the delays on CK and CKN in these stages.

FIG. 3 shows detail of one of the data bit-slices for PHYT[n]. It is configured to receive phyt_hi[n] and phyt_lo[n] input signals. A retime circuit 60 receives the phyt_hi[n] and phyt_lo[n] input signals and assembles these single clock edge signals temporally into four signals EFGH with the clock signal clk_retime. The clock signal clk_retime is half the speed of the clock signal clk_drive (and the PLL clock signal clk_pll).

The output signals EFGH of the retime circuit 60 are input to a sequencing logic circuit 62 which may be the same as that in the CK/CKN bit slice. The output of the sequencing logic circuit 62, phyt_seq, is then correctly aligned with output of the sequencing logic 58 clk_seq in the CK/CKN bit-slice since both are driven by the clock signal clk_drive. Subsequently the output of the sequencing logic circuit 62 phyt_seq is propagated through the '0' input of a second multiplexor 64 and a first XOR gate 66 with '0' as its second input and a pad circuit to the external interface. The matching of these paths between data and CK/CKN bit-slices is to maintain as good a balance as possible of the interface signals. Accordingly a second XOR gate 68 is provided but its output is not connected. The "1" input of the second multiplexor 64 is unused.

It should be appreciated that in other embodiments the data bit-slice circuitry is amenable to connection to an associated slave PDD by utilizing the '1' input to the second multiplexor and providing a relevant multiplexor select signal. Adjustment in the retime circuit may be needed to accommodate the slave PDD delay. Each bit would require a scale circuit for individual adjustment. This arrangement could be used to fine-tune the timing of each data bit in order to compensate skew imposed by on-chip, package and PCB routing.

Figure 4:
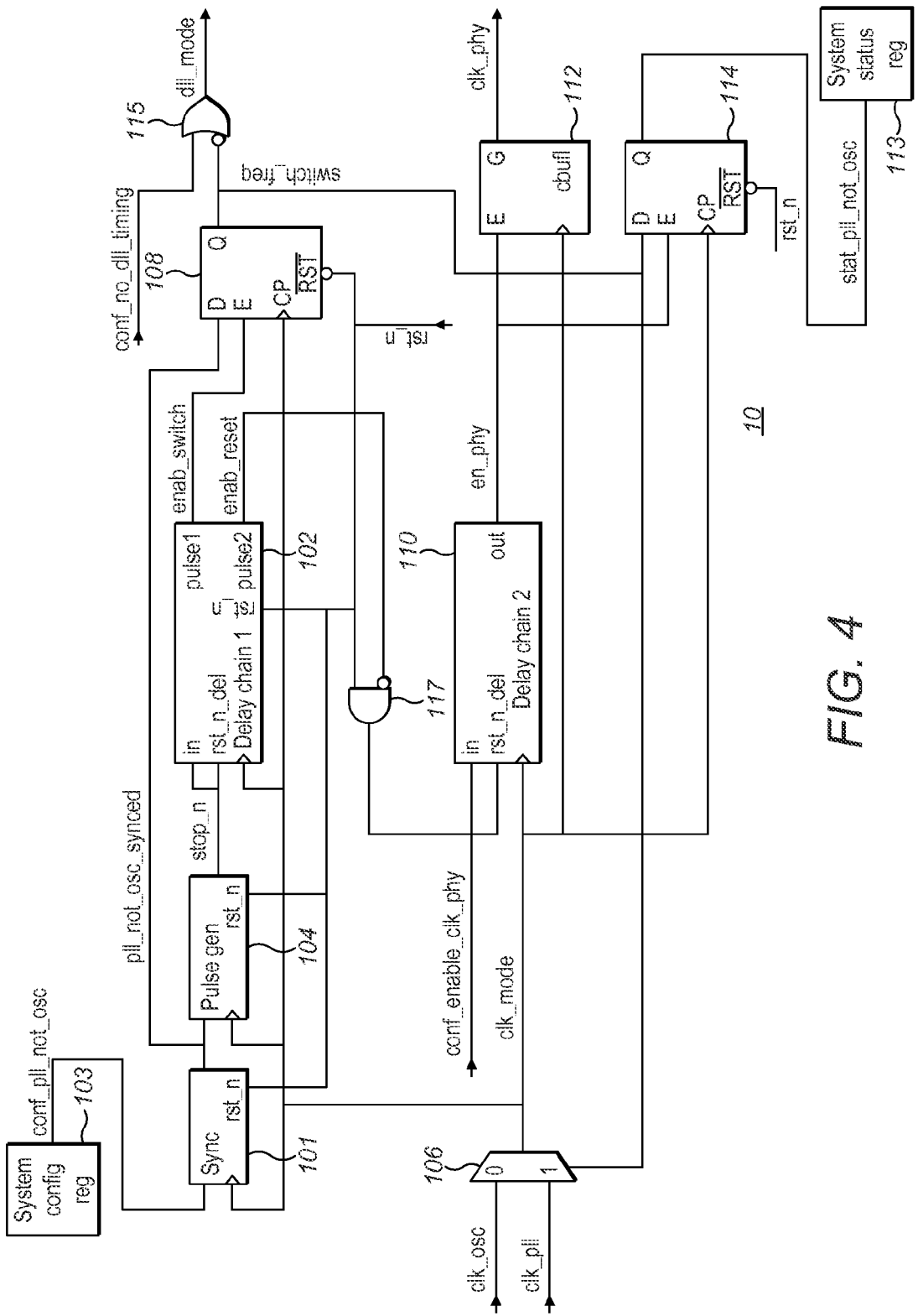
FIG. 4 shows the transmitter physical interface control circuitry of the arrangement of FIG. 1.

Reference is now made to FIG. 4 which shows the control circuit 10 of FIGS. 1 and 2 in more detail.

The oscillator clock clk_osc and the PLL clock clk_pll are input to a first multiplexor 106. The multiplexor 106 receives a control input switch_freq from the output of a first flip flop 108 which controls which of the clock signals is selected. The selected clock signal is then output as a clock signal clk_mode from the first multiplexor 106 and determines the mode of operation of the interface, PLL or oscillator, depending on the value of the signal. This signal is provided to the synchronizer, pulse generator, delay chain circuits and various other circuitry as described later.

The configuration input conf_pll_not_osc (which forces a change to PLL mode from OSC mode or vice versa depending on the value of the signal) is driven from a system configuration register 103. This register is controlled by software and gives the instruction to change from a PLL to an oscillator mode and vice versa. Since it is required to change mode during the operation of the interface (on-the-fly) a synchronizer 101 is provided to align this input to the control clock clk_mode, used as the clock input. The synchronization of configuration conf_pll_not_osc to the clock signal clk_mode is performed at either PLL clock clk_pll or the oscillator clk_osc speed depending on the mode of operation prior to the switch.

The output of the synchronizer 101, pll_not_osc_synced is input to a pulse generator 104 which also receives the clock signal clk_mode. The pulse generator 104 will generate a low-going pulse on stop_n when the output of the synchronizer 101 pll_not_osc_synced changes state. The output of the pulse generator stop_n is input to first delay chain circuit.

Figure 5:
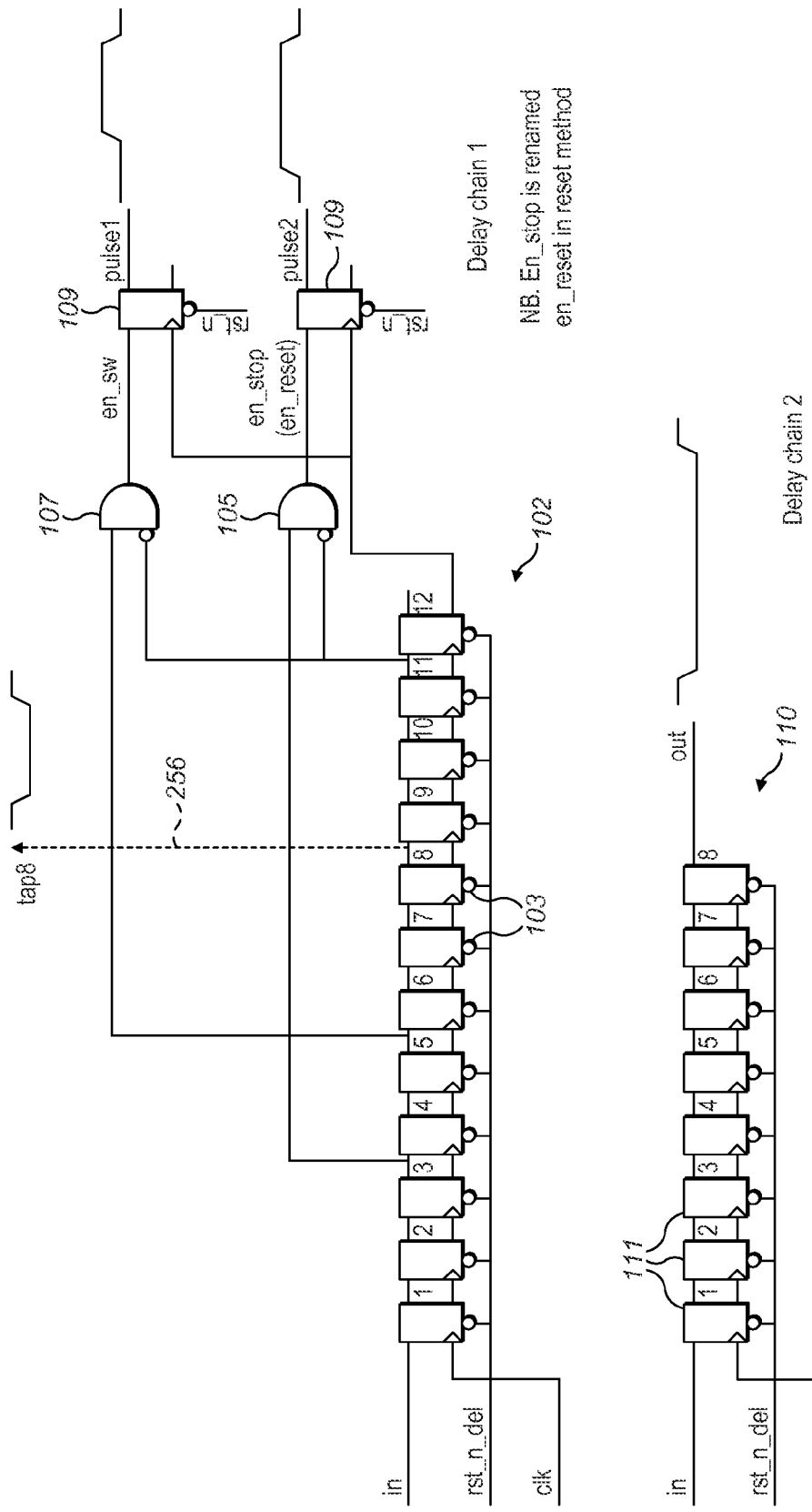
FIG. 5 shows in detail the delay chains of the control circuit of FIG. 4.

With reference to FIG. 5 the first delay chain comprises a chain of twelve flip flops 102 and other logic. By way of example only, twelve flip flops are shown. However, more or less than twelve flip flops may be provided. The flip flops 103 are arranged in series such that the output of one flip flop provides the input to the next flip flop. Each of the flip flops receives either the oscillator clock or the PLL clock as the control clock clk_mode depending on the mode of operation. The stop_n pulse is input to the data input of the first flip flop and the reset signal rst_n_del is input to the reset input of the flip flops. This causes the flip flops to reset and the rising edge of the signal stop_n to be propagated through the chain. This propagating edge then produces high-going pulses by use of the AND gates that have one input inverted as shown. For example, the pulse on en_sw (enabling switching signal) starts when the edge propagates to the output of the fifth flip flop and terminates when it propagates to the output of the eleventh flip flop. Thus a first AND gate 107 receives the output of the fifth flip flop and the inverted output of the eleventh flip flop.

In one alternative, the data input of the first flip flop may be tied to the voltage supply Vdd.

Similarly the pulse on signal en_stop (stopping signal) starts when the edge propagates to the output of the third flip flop and terminates when it propagates to the output of the eleventh flip flop. Thus a second AND gate 105 receives the output of the third flip flop and the inverted output of the eleventh flip flop.

The output of the first and second AND gates 107 and 105 are provided to the input of respective flip flops 109. The flip flops 109 receive the clock signal clk_mode. The flip flops 109 driving the outputs are to ensure a correct state on pulse1 derived from en_sw and pulse2 derived from en_stop respectively after system reset (rst_n) and incur a one cycle delay on both en_sw and en_stop.

The durations of the pulses on en_stop and en_sw are chosen to determine periods in which the interface is stopped and when the frequency switch takes place respectively. These periods can be adjusted by selecting the taps on the delay chain of the flip flops to suit. These and other timing features will be described in more detail later with reference to the timing diagram of FIG. 8.

Referring back to FIG. 4, the output of the synchronizer 101 pll_not_osc_synced is also provided to a D input of the first flip flop 108. This first flip flop 108 is arranged to receive the clock signal clk_mode. The first flip flop 108 is also arranged to receive an enable signal enab_switch. enab_switch is pulse1 from the delay chain 102. The output provided by the first flip flop 108 is a signal switch_freq. This output controls the switching from one clock frequency to another at the multiplexor 106 and will be high to select the PLL clock frequency and low to select the oscillator clock frequency.

It should be noted that the connection of switch_freq to multiplexor 106 completes a timing loop which is active only when the interface is stopped. In some embodiments any glitches that may occur on the signal clk_mode due to the switch caused by signal switch_freq changing the multiplexor state from clk_osc to clk_pll or vice versa are not critical.

The second output of the delay chain 102 (pulse 2) enab_stop is inverted and input to an AND gate 117. The other input of AND gate 117 is system reset rst_n. The output of AND gate 117 is rst_n_stop which is therefore active low when enab_stop pulse is active or on system reset. rst_n_stop is input to a second delay chain 110.

Reference is again made to FIG. 5 which shows the second delay chain 110. The second delay chain 110 comprises eight flip flops 111 connected sequentially and are used to delay the high going edge of the signal rst_n_stop. The delay chain may be provided as it may avoid the need to construct a reset tree (to guarantee that all circuits inside the transmitter physical interface are synchronized). Therefore in this embodiment the clock signal clk_phy is stopped via en_phy (for an equivalent eight clock cycles) after the reset and hence the clock signals (clk_drive, clk_mem, clk_tx) generated by the clock generator are disabled during this period also. This eliminates any critical timing between rst_n and these clocks so ensuring a reliable synchronization after reset. This is the purpose of the second delay chain circuit. By way of example only, eight flip flops are shown. However, more or less than eight flip flops may be provided.

The output of the second delay chain 110 is an enable signal en_phy, which is low for the duration of the reset pulse rst_n_stop plus the 8 cycles provided by the second delay chain 110. The enable signal en_phy is input as an enable signal to a clock gated buffer 112 to control the activation of the output clock clk_phy. The clock input of the clock gated buffer is the signal clk_mode. Therefore during the switching phase initiated by the signal conf_pll_not_osc changing state, the output clk_phy will be stopped for the duration of the low period of the enable signal en_phy. The clock gating buffer 112 may ensure no glitches on the clock signal clk_phy during this period. When the clock signal clk_phy, output by the clock gated buffer, is stopped, the interface is stopped (since clk_phy is the input clock of the clock generator which generates the clocks that control the propagation of clock, data and valid in the bit-slices).

The data input in of the first flip flop 111 of the second delay chain 110 receives a configuration signal conf_enable_clk_phy. This configuration signal acts as a means to power down the transmitter physical interface. When high the operation of the control circuit is as described thus far, when it is low the state of the output of the second delay chain 111 en_phy will also be low, disabling the clock signal clk_phy output from the clock gated buffer 112. As this is the input to the clock generator 8, the clock generator 8 and also the transmitter physical interface are disabled.

The enable signal en_phy output by second delay chain 110 is also provided to the enable input of a second flip flop 114. The second flip flop 114 receives a clock input clk_mode, i.e. the oscillator clock or the PLL clock. The data input is provided by the same signal which controls the multiplexor 106, that is the switch_freq signal which is output by the first flip flop 108. The output of the second flip flop 114 is the signal stat_pll_not_osc which indicates, if high, that the interface is operating at the frequency determined by the PLL or, if low, at the frequency determined by the oscillator. This output signal is routed to a system status register 113 in order to provide the controlling software with this information.

The time when the signal stat_pll_not_osc is updated is at the end of the switch phase when the transmitter physical interface clocks are restarted at the new frequency i.e. when the signal en_phy goes high.

A NOR gate 115 has a first input which is signal switch_freq output by the first flip flop 108 inverted and a second input which has the configuration signal conf_no_dll_timing. The output of this NOR gate 115 is a signal dll_mode which is shown in FIGS. 2 and 3. This signal is input to the CK/CKN bit slice 54. This signal will control if the DLL is used or not. If the frequency of the interface is the frequency determined by the oscillator then the DLL is not used since the timing is coarse with ample capture margin on the receive die, as explained. Generally if the frequency of the interface is the frequency determined by the PLL then the DLL is used for its ability to finely adjust the phase of CK/CKN and hence the capture timing. However if it is found that the system is reliable, without the need for phase accuracy or adjustment provided by the DLL at PLL frequencies, (this may be just at lower PLL frequencies in some embodiments), then conf_no_dll_timing can be set high forcing the signal dll_mode to '0'. The clock bit-slice timing is then controlled only by the path through the sequencing logic. In this case the DLL can be switched off by setting the configuration signal conf_enable_clk_dll (see later) low in order to save power. This switches off the signal clk_dll to the DLL clock generator 40 so disabling the internal clocks of the DLL 16. In this case the DLL lock is logically forced to '1' in order that the software control monitoring of the status registers is not left hanging.

Figure 6:
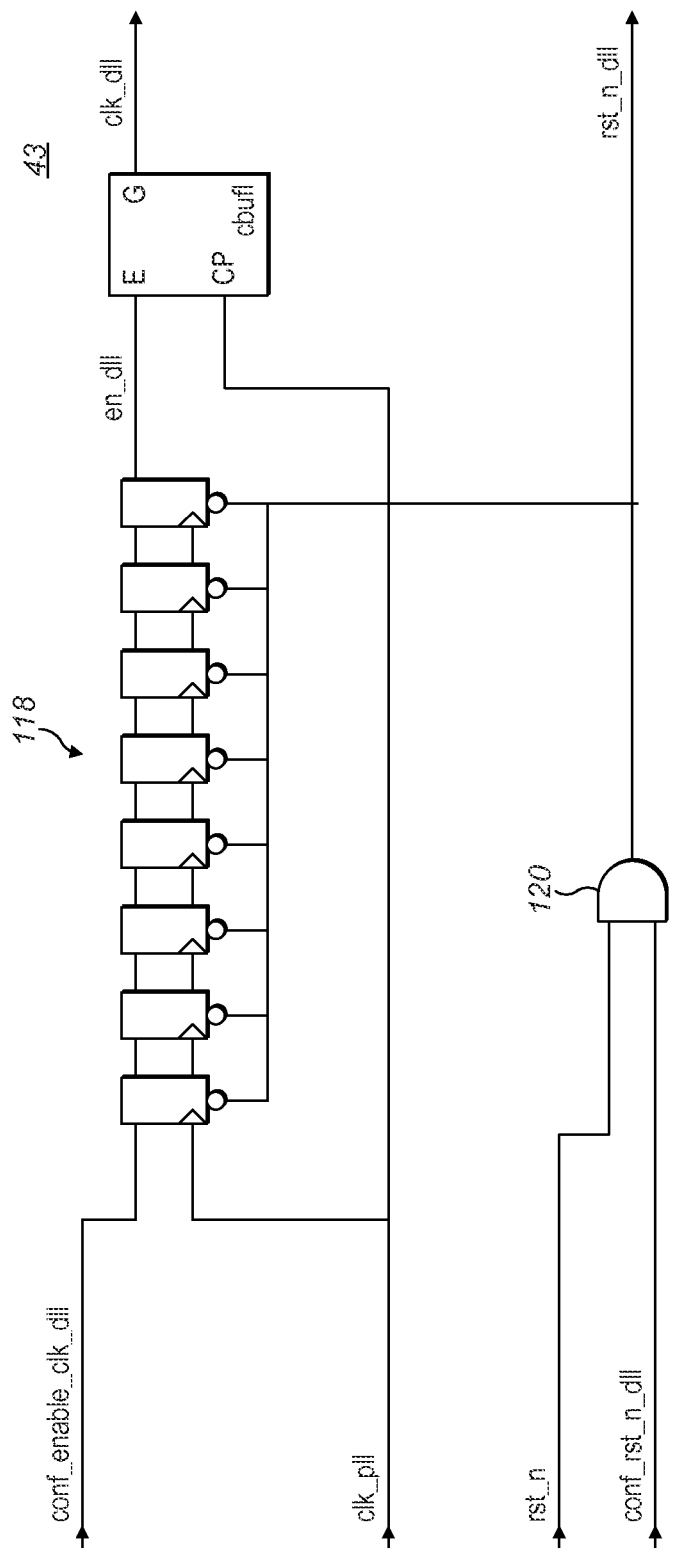
FIG. 6 shows in detail the DLL control circuitry.

FIG. 6 shows detail of the DLL control circuit 43 shown in FIG. 2. The DLL may only be required during the PLL frequency mode of operation and hence only the clock signal clk_pll is required as a clock input to the DLL control circuit. The clock signal clk_pll is the clock input to a clock gated buffer 116. The clock signal clk_dll is the output of the clock gated buffer 116. The clock signal clk_pll is a clock input to a chain 118 of eight flip flops which is used to provide an eight cycle delay after reset before the clock signal clk_dll is started. This may be for similar reasons as discussed previously in relation to the reset signal.

The input to the chain 118 of flip flops is the configuration input conf_enable_clk_dll. This can be set low to disable the DLL when it is not required if the interface is found to be reliable without the need of the fine adjustment provided by the DLL. In this case the enable signal en_dll, the output of the delay chain, is permanently held low so disabling the clock signal clk_dll and hence the DLL.

An AND gate 120 has a first input rst_n which is the system reset and a second configuration input conf_rst_n_dll. The output of the AND gate 120 is a reset signal rst_n_dll. This is used to reset the chain 118 of flip flops in the DLL control circuit and is also output to the DLL 119 as shown in FIG. 2. This means the chain of flip flops and the DLL is reset either on system reset or via the configuration input conf_rst_n_dll if that input is forced low. The configuration signal conf_rst_n_dll is used to reset the DLL during the oscillator mode of operation during the change between two PLL frequencies.

Figure 7:
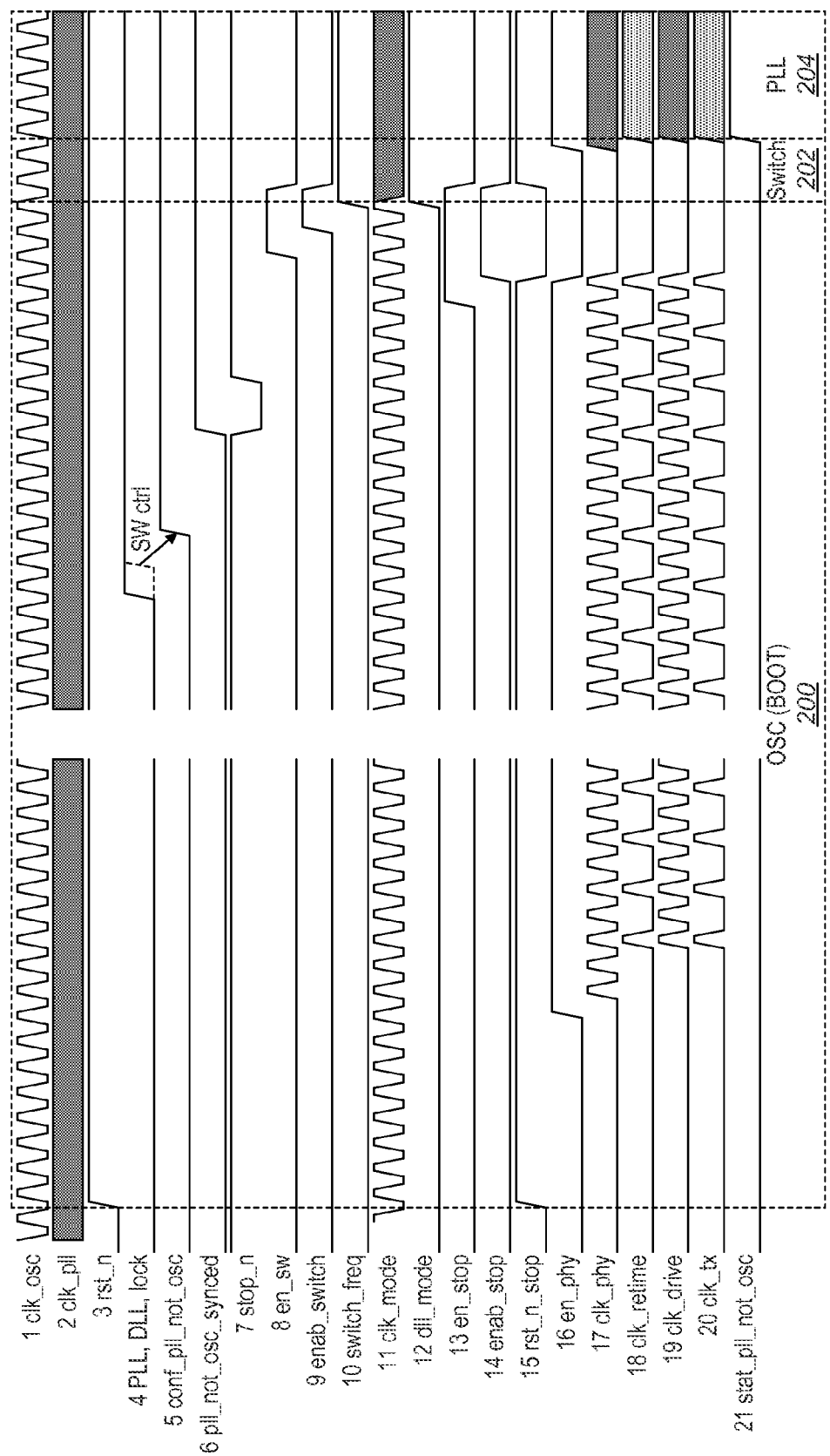
FIG. 7 shows a timing diagram.
Figure 8:
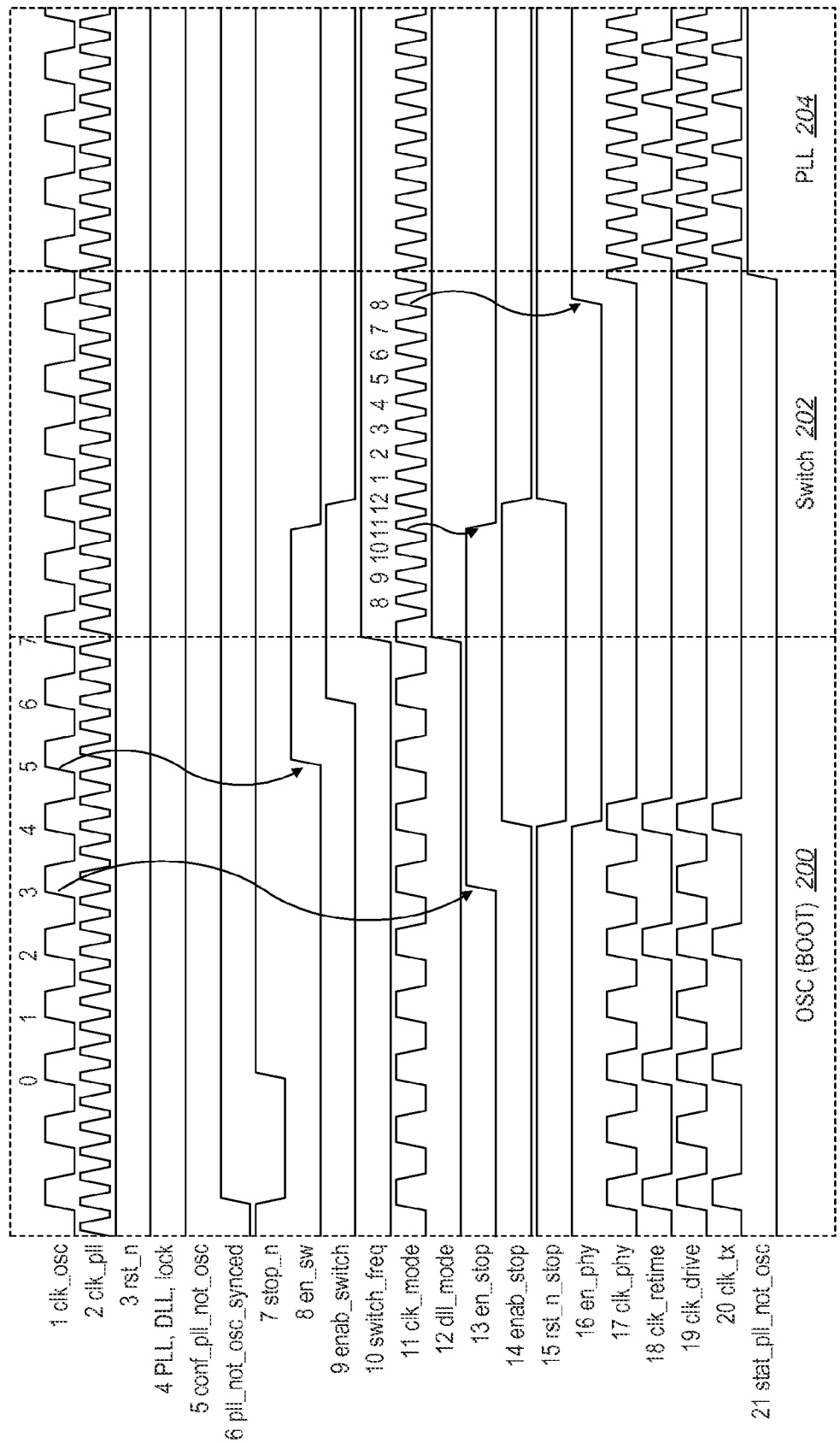
FIG. 8 shows a detailed timing diagram during the frequency switching phase.
Figure 9:
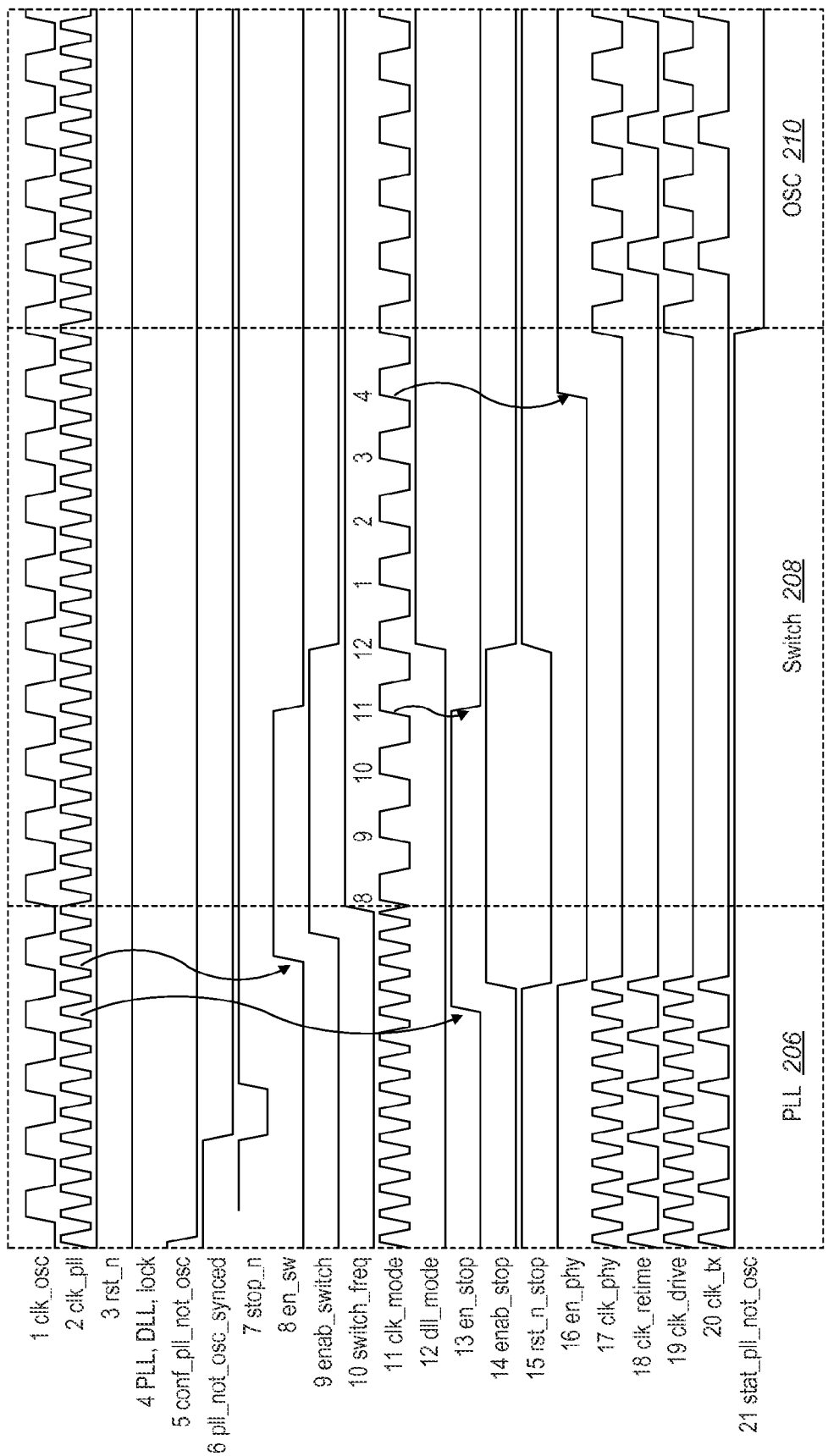
FIG. 9 shows a detailed timing diagram of the reverse frequency switch to that of FIG. 8.

To assist with the understanding of some embodiments, reference is made to FIGS. 7, 8 and 9. These show timing diagrams of various signals as shown in the previous figures. The timing diagram of FIG. 7 is divided into a first region OSC (BOOT) 200 where the interface comes out of reset and starts running at the frequency determined by the oscillator, a second region 202 where the interface is stopped and the switch is being made between the oscillator clock and the PLL clock, and a third region 204 where the interface is running at the PLL frequency.

The first line shows the oscillator frequency clk_osc whilst the second line shows the PLL clock frequency clk_pll. This is shown as a solid line to schematically indicate that the PLL clock frequency is much faster than the oscillator clock frequency. In all the timing diagrams the actual frequencies of the two clocks are not accurately represented for clarity. In the arrangement shown, the reset signal rst_n goes high at the beginning of the sequence (beginning of the first region 200) to bring the interface out of reset. There is an eight cycle delay before the clock signal clk_phy starts due to the flip flops in the second delay chain 110. It should be noted that in reset, the state of the control circuit 10 is forced to be in oscillator mode in order that the circuit is ready to run at the frequency determined by the oscillator when the clocks start. In this regard the signals pll_not_osc_synced (line 6), switch_freq (line 10), en_phy (line 16) and stat_pll_not_osc (line 21) are all forced low.

Line 4 shows the PLL and DLL lock signals. PLL lock goes high at an arbitrary time on the diagram and the relative time between PLL lock and DLL lock has been compressed for drawing convenience. When the software control has detected that both PLL and DLL are in lock it sets the configuration register driving conf_pll_not_osc (line 5) to '1' to change from the oscillator mode to PLL mode. This input is then synchronized to the signal clk_mode-line 11 (which is will be at clk_osc frequency-line 1). This synchronized signal is pll_not_osc_synced (line 6).

Line 7 shows the low-going pulse on signal stop_n. This is the output of the pulse generator 104. The signal is triggered to go low by the rising or falling edge of the pll_not_osc_synced signal (line 6). Here the signal is triggered to go low by the rising edge and the duration of the pulse is two cycles. This is controlled by timing inside the pulse generator 104.

The remainder of the switching sequence is shown in more detail in FIG. 8.

The low-going pulse on stop_n signal (line 7) causes the signal en_sw (line 8) to pulse high at a time as described previously and as shown. The signal enab_switch (line 9) follows the signal en_sw (line 8) one cycle later as shown. When the signal enab_switch (line 9) has gone high the flip flop 108 is enabled such that on the next high going clock edge of the clock signal clk_mode (line 11) the flip flop 108 will propagate the new high state of the signal pll_not_osc_synced (line 6) to the signal switch_freq (line 10).

At this time the multiplexor 106 is switched from propagating the clock signal clk_osc to propagating clk_pll as shown by the signal clk_mode (line 11). If a glitch were generated on clk_mode during this switch the only effect would be an interpretation of a potential lost or extra pulse by the chain of flip flops in the first delay chain 102. This would have the net effect of shortening or lengthening the generated pulses from the first delay chain, and subsequent pulses, by one cycle but this may have no adverse impact as their durations may be set fairly arbitrarily and may not be critical in the overall switch sequence. In any case the clocks applied to the transmitter physical interface have already been stopped by the action of the signal en_phy (line 16) going low. This stops the interface so that no corruption of data is possible.

The signal dll_mode is shown on line 12. This signal is aligned to the signal switch_freq (line 10) when DLL timing is used during PLL phase of operation.

To illustrate an embodiment, the numerals above the clock signal clk_osc (line 1) and the clock signal clk_mode (line 11) indicate the cycle number after the signal stop_n pulse (line 7). The numbers starting 0 through 12 represent the taps on the delay chain in the first delay chain 102. The next numbers then restart from 1 through 8 to represent the taps on the delay chain in second delay chain 110. Since the signal switch_freq (line 10) changes state at cycle 7 (of the first chain and of the clock clk_osc) then the cycle count from cycle 8 onwards continues at the new frequency (clk_pll) after this time. It can be seen for example the pulse on en_stop (line 13) starts on cycle 3 and finishes on cycle 11 corresponding to the taps of the first delay chain input to AND gate 110.

On the next line the signal enab_stop (line 14) is seen to follow the signal en_stop (line 13) by one cycle. The signal rst_n_stop (line 15) is the signal enab_stop inverted. The signal en_phy on line 16 is the signal that controls the stopping of the interface. The low-going pulse on the signal en_phy starts on cycle 4 of the first delay chain and ends on cycle 8 of the second delay chain; representing the period during which the transmitter physical interface clocks are stopped.

The clock signal clk_phy is shown on line 17. This is the output of the clock gated buffer 112. Initially, the clock signal clk_phy, which is the source clock of the clock generator of the transmitter, is at the oscillator frequency. This clock is then switched off when the signal en_phy goes low. This clock will be switched on again at the PLL frequency when the signal en_phy goes high at the end of the switch phase. Thus, the clock signal which is used to control the transmitter physical interface is initially at the frequency determined by the oscillator, is then switched off in the low state, and then switched back on at the frequency determined by the PLL. When this clock frequency is switched off, this stops the transmitter physical interface 6.

Line 18 shows the signal clk_retime, which is a clock signal provided by the clock generator 8. In this embodiment the signal clk_retime runs at half the frequency of the clock signal clk_phy with a 25% duty cycle. This value of duty cycle is only one example of a possible value. When the clock signal clk_phy stops so does the clock signal clk_retime.

Line 19 shows the clock signal clk_drive, which is also a clock signal, provided by the clock generator 8. As can be seen, this signal has the same frequency and duty cycle as the clock signal clk_phy. When the clock signal clk_phy stops so does the clock signal clk_drive.

Line 20 shows the clock signal clk_tx which is generated in the clock generator 8, and is used to control the flow of data from transmitter controller 18 to the transmitter physical interface 6. The clock signal clk_tx has the same frequency and duty cycle as the clock signal clk_retime such that the flight time allowance of data propagating from transmitter controller to the transmitter physical interface is one period of clk_tx. The signal clk_tx is stopped when the clock signal clk_phy is stopped so inhibiting the flow of data from the transmitter controller during the frequency switching sequence. The signal clk_tx restarts with the other clocks at the start of the new frequency mode. This means that the signal clk_tx is synchronized with CK/CKN and hence the clock of the receiver physical interface clk_rx (shown in FIG. 1). The signal clk_rx is derived from CK/CKN (with the same frequency) and is used as the source clock of receiver controller. The synchronization of clk_tx and clk_rx in this way may make the interface compatible with data encryption/decryption on each side of the link since the code keys on each die are kept aligned through the frequency switching sequence.

The signal stat_pll_not_osc (line 21), switches from low to high at the end of the switch phase, signaling to the software control the transition from the oscillator to PLL modes. This is the output of the second flip flop 114.

FIG. 9 shows the timing diagram of the same signals but for a change from PLL to oscillator modes. It is divided into the PLL 206, switching 208 and oscillator 210 regions and gives the same numerals for the cycle count after stop_n pulse (line 7). For clarity only, the delay of the second delay chain has been reduced from 8 to 4 cycles. This sequence is the same as for the change from the oscillator to PLL modes described except with the relative frequencies reversed in order. The number of cycles in each part of the sequence may be the same in either case.

In the embodiment described, when the mode of operation is changed from the oscillator to the PLL mode, the clock to the transmitter physical interface is stopped. In other words, the propagation of data in the interface is stopped. Any data in the transmitter physical interface and receiver physical interface is retained until the clock is restarted at the PLL frequency. It should be appreciated that this will occur for changes from oscillator to PLL clock frequencies and vice versa.

In some embodiments, the software may initiate the frequency switching sequence.

The software algorithm of changing from OSC to PLL modes, including from the boot period will now be described.

The software will first assert the DLL reset by setting the signal conf_rst_n_dll to '0', then configure the PLL to the required frequency setting of clk_pll and then poll the PLL lock status. When PLL lock is achieved the software de-asserts the DLL reset by setting conf_rst_n_dll to '1' and then polls the DLL lock status. When DLL lock is achieved the software sets the frequency mode configuration signal conf_pll_not_osc to '1' to initiate the frequency switching sequence.

The change of mode of operation to the frequency determined by the PLL will then be controlled by the control circuit in the manner previously described. The sequence will be completed when the status output stat_pll_not_osc is set to '1'. The software will poll the status register associated with the signal stat_pll_not_osc.

Alternative or additionally the frequency switch can be between a first frequency determined by the PLL and a second frequency determined by the PLL via the frequency determined by the oscillator.

The software algorithm of changing from PLL to OSC modes will now be described. The software will reset the frequency mode configuration signal conf_pll_not_osc to '0'. The change of mode of operation to the OSC frequency will then be controlled by the control circuit as described. The sequence will be completed when the status output stat_pll_not_osc is set to '0'. The software will poll the status register associated with the signal stat_pll_not_osc.

If a change in mode of operation to a new PLL frequency is required, the software asserts the DLL reset then reconfigures the PLL to the new frequency setting and so on, as described previously in relation to the change from the oscillator frequency to the PLL frequency.

In summary, if a change in PLL frequency is required, then the sequence would be PLL frequency 1, stop the transmitter physical interface then restart at the frequency determined by the oscillator. In parallel reconfigure PLL and enable DLL waiting for the lock signals, again stop the transmitter physical interface and restart at the new PLL frequency 2.

Embodiments allow the inter die channel to have the frequency changed on the fly. The frequency switch may be between the frequency determined by the oscillator and a frequency determined by the PLL. This scenario may be used after power up when the channel between the two dies operate at the frequency determined by the oscillator. This may be used to transfer the boot data between the die. Alternatively or additionally, the frequency switch can be from a first PLL frequency to a second PLL frequency via the oscillator frequency.

Embodiments allow the PLL/DLLs to obtain lock during the oscillator phase. The DLL may not be required at the oscillator frequency. The switch to the new PLL frequency may be gated by the PLL/DLL lock signals.

No hand shaking with the controller may be required in some embodiments.

In one modification to the embodiments previously described, a resetting of the transmitter takes place during the switching between the oscillator frequency and the PLL frequency. This resetting may take place when changing from a PLL frequency to an oscillator frequency and/or when changing from an oscillator frequency to a PLL frequency. The change from one PLL frequency to another is via the oscillator frequency, in similar fashion to the previously described embodiment, and hence the resetting of the interface takes place twice during this switching. This modification may be used where no data is to be held on inter die signals during a frequency switch.

One embodiment with this modification is now described with reference to FIGS. 10 to 13.

Figure 10:
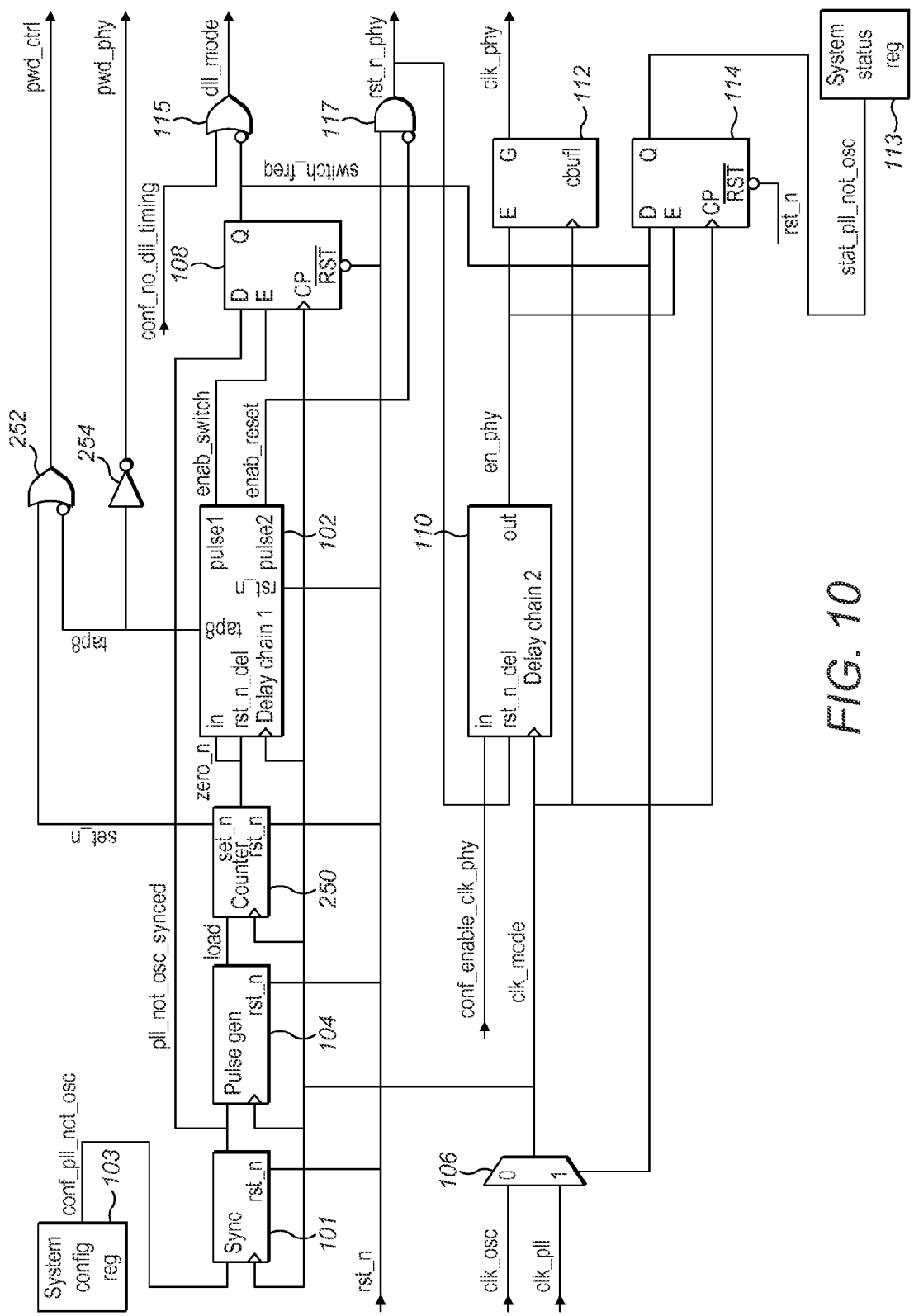
FIG. 10 shows a transmitter physical interface control circuitry of a second embodiment.

Reference is first made to FIG. 10 which is an alternative to the control circuit of FIG. 1. The control circuit is as shown in FIG. 4 with following differences. An output signal load of the pulse generator 104 is provided to a counter 250. It should be noted that the pulse generated on signal load, in response to the signal conf_pll_not_osc changing state to initiate a change of frequency, is a high-going pulse which is contrary to the low-going pulse generated on stop_n in the previously described embodiment. This difference is achieved by the inclusion of an inverter in the output path of the pulse generator circuit. The counter 250 receives the clock clk_mode, the controlling clock of the control circuit. The counter 250 has a first output zero_n which is provided to the first delay chain 102 and a second output set_n. The counter has a reset input which is configured to receive the system reset signal rst_n.

Figure 11:
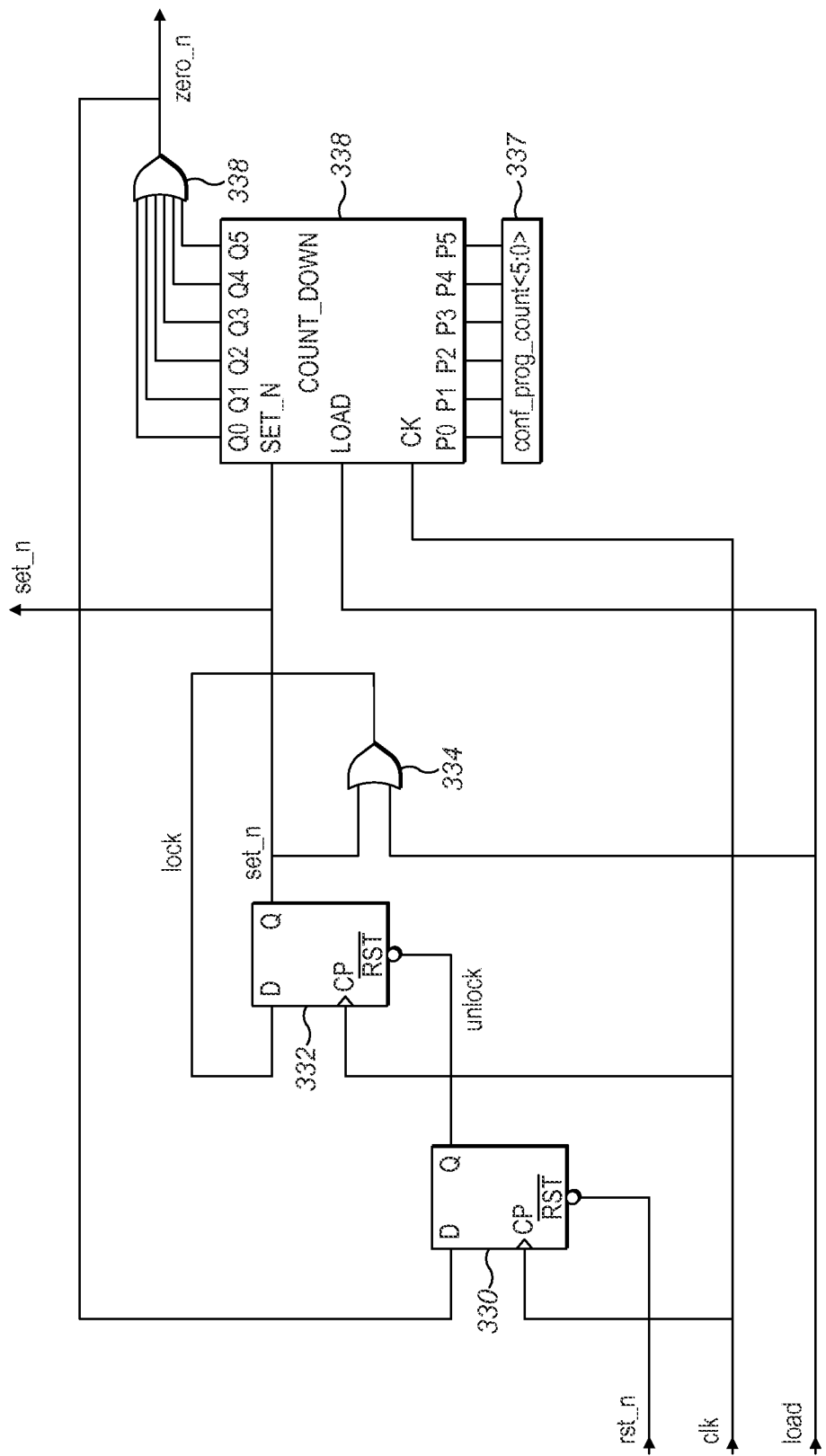
FIG. 11 shows a counter circuit of the transmitter physical interface control circuitry of FIG. 10.

Reference is now made to FIG. 11 which shows the counter 250 in more detail. The active low system reset signal rst_n is the reset input to a first flip-flop 330. Thus on system reset the Q output of flip-flop 330 is forced low. This is the signal unlock of the counter circuit. The signal unlock is the reset signal of a second flip-flop 332 and so its Q output is also set low on system reset. This is the signal set_n of the counter circuit. Both clock (CP) inputs of flip-flops 330 and 332 are the control clock clk_mode.

The signal set_n is the first input of an OR gate 334, the second input of which is the signal load, the output signal of the pulse generator 104. Until the first occurrence of a pulse, from the pulse generator 104, load is in the low state. Therefore during this time both inputs to OR gate 334 are low and hence signal lock, the output of OR gate 334, is also low. The signal lock is fed back to the D input to flip-flop 332. So between the de-assertion of system reset rst_n and the first pulse on load both set_n and lock are maintained in a low state. This relates to the period before the first load pulse and when the interface is in oscillator mode.

The signal set_n is also an input to a countdown counter 336. Whilst set_n is low the outputs Q0-Q5 of the countdown counter are forced high. The signals Q0-Q5 are the inputs to an OR gate 338. Therefore the signal zero_n, the output of the OR gate 338 is forced high. zero_n is connected to the D input of flip-flop 330 so that after system reset rst_n de-assertion the high state of zero_n is propagated to the signal unlock, so removing the reset state from flip-flop 332. This completes the state of the countdown counter controlling logic, after system reset, such that load, set_n and lock are low and zero_n and unlock are high. The logic will maintain this state until the first pulse on load, from the pulse generator. This state can be regarded as the quiescent state of the counter circuit.

Referring back to FIG. 10, the set_n output of the counter 250 is provided to a first OR gate 252. The second input of the first OR gate 252 is inverted and provided by the eighth tap, tap8, of the first delay chain 102. This is referenced 256 in FIG. 5. The output of this OR gate is a power down signal pwd_ctrl. This signal is provided to the clock generator 8. When active high it will stop the clock clk_tx by means of a glitch-free switch inside the clock generator.

The signal tap8 is also input to an inverter 254. The output of inverter 254 is a power down signal pwd_phy for the physical transmitter interface. This signal is provided to the clock generator 8. When active high it will stop the clocks clk_retime and clk_drive by means of glitch-free switches in the clock generator.

In the quiescent state of the counter circuit set_n is low and tap8 is high. This will mean pwd_ctrl and pwd_phy are both in an inactive low state allowing the propagation of data in the interface.

The countdown counter 336 receives the clock signal clk_mode at the clock input. The countdown counter is configurable and comprises programmable values 337. The output signal load of the pulse generator is provided to the load input of the countdown counter 136. When the high-going pulse is generated on signal load by the pulse generator, this causes the programmable values to be loaded into the countdown counter inputs P0-P5.

The high-going pulse on load causes the output of OR gate 334 lock to go high so that the next clock edge of clk_mode will cause the output of flip-flop 332 set_n to go high. This releases the set input of the countdown counter from forcing Q0-Q5 high and causes the countdown counter to start counting down from the programmable value P0-P5 loaded by the load pulse.

When set_n goes high, this forces pwd_ctrl high; this stops the clock clk_tx. This prevents the flow of data from the TX controller 18 and is the start of the flushing period of data from TX PHY 6, since clk_retime and clk_drive remain active at this time, propagating data still in TX PHY.

When the countdown counter has completed the count, each of the values Q0-Q5 will be zero. The output of the OR gate 338, zero_n, will then go low. Since zero_n is provided to the first input of flip-flop 330, when zero_n goes low at the end of the count a low will be propagated to unlock on the next clock edge of clk_mode. This will reset flip-flop 332 forcing set_n low. At this time load is low and hence the output of OR gate 334 lock is forced low. Since lock is fed back as the D input of flip-flop 332, this state will be maintained. set_n low will again force the outputs of the countdown counter Q0-Q5 high and thus zero_n high. This high state will propagate through flip-flop 330 to signal unlock on the next clk_mode edge. Therefore the counter control logic is returned to the quiescent state (load, lock and set_n are low and zero_n and unlock are high.)

It should be appreciated that zero_n is provided to the first chain of flip flops 102. At the end of the count zero_n goes low then high, as described above. This low-going pulse on zero_n will reset the first chain of flops 102, and the high-going edge of the pulse will propagate through the delay chain (as previously described for stop_n.) Therefore tap8 will go low when zero_n resets the chain and high again when the high-going edge propagates to tap8. pwd_phy, which is inverted tap8, will pulse high during this period. Therefore pwd_phy goes high at the end of the count so stopping clk_retime and clk_drive. This marks the end of the flushing period. It should be appreciated that the programmable value loaded into the counter must be sufficient to allow all the data in TX PHY to be propagated and captured in the RX die. This value will depend on latency number of clock cycles through the TX and RX PHYs and may vary in different implementations. Accordingly, in some embodiments, this programmability is provided. The first delay chain as used in this embodiment is as shown in FIG. 5.

However in this embodiment, the signal output by the AND gate 105 is referred to as en_reset as in this embodiment this signal will enable a reset operation. The function of the first delay chain is the same as in the previously described embodiment, in particular with reference to the generation of the signals enab_switch, switch_freq and dll_mode. The differences are in the generation of the signal tap8 to control the switching of pwd_ctrl and pwd_phy and the renaming of enab_stop to enab_reset which has a slightly different role. enab_reset is inverted then input to the AND gate 117 shown in FIG. 10 which provides a signal rst_n_phy. The other input to AND gate 117 is system reset rst_n. Therefore rst_n_phy is used to reset the physical transmitter interface and the clock generator either on system reset or during the frequency switching sequence controlled by the pulse on enab_reset.

The signal rst_n_phy is also used as the reset input to the second delay chain where the role of rst_n_phy is the same as rst_n_stop in the previous embodiment, as is the function of the second delay chain. The output signal en_phy has the same function with regard to the control of the clock clk_phy and the generation of the status signal stat_pll_not_osc.

When tap8 returns high (when the high-going edge of zero_n has propagated to tap8) this forces both pwd_ctrl and pwd_phy to their default low states. It should be noted that at this time rst_n_phy is active low and therefore TX PHY and clock generator are in reset. The next event in the frequency switch sequence is that rst_n_phy will go high a few cycles later (at cycle 12 of the first delay chain). Again en_phy will hold the start of clk_phy for eight cycles for reliable resetting of the PHY. When en_phy goes high to enable clk_phy and thus all the TX PHY clocks, the start-up sequence of the PHY clocks is the same as when TX PHY exited system reset.

The software controlled switching algorithm for this embodiment will now be described firstly for when the mode is changed from the oscillator to PLL mode. The following occurs. First, DLL reset is asserted. The PLL is then configured to set the PLL frequency clk_pll. When the PLL is locked, the DLL reset is de-asserted. Following lock of the DLL the software control sets the signal conf_pll_not_osc to 1. The role of the control circuit then causes the clock (clk_tx) to the controller 18 to be switched off to stop the propagation of data to the interface. A number of cycles are waited in order to flush the physical transmitter and receiver interfaces. The clocks (clk_retime, clk_drive) to the physical transmitter interface are switched off. The physical transmitter interface is reset by asserting the reset signal rst_n_phy. The control circuit waits a number of cycles before de-asserting this reset signal. The clocks then resume at the frequency determined by the PLL eight cycles later. The status signal stat_pll_not_osc is then set to 1 and stored in the status register 113.

The software controlled switching algorithm for this embodiment will now be described for when the mode is changed from the PLL to oscillator mode.

The following occurs. The signal conf_pll_not_osc is reset to 0. The software polls the stat_pll_not_osc status register. The stopping of the clock clk_tx, flushing of data, stopping of clocks clk_retime and clk_drive, resetting of TX PHY and clock generator and restarting of the clocks is performed by the control circuit as described previously. However the new clock frequency will be the oscillator frequency and the status signal stat_pll_not_osc is then set to 0 and stored in the status register 113.

This software control can also be used to change between PLL frequencies, by switching via the oscillator frequency in a two step sequence of PLL to oscillator and then oscillator to PLL modes.

Figure 12:
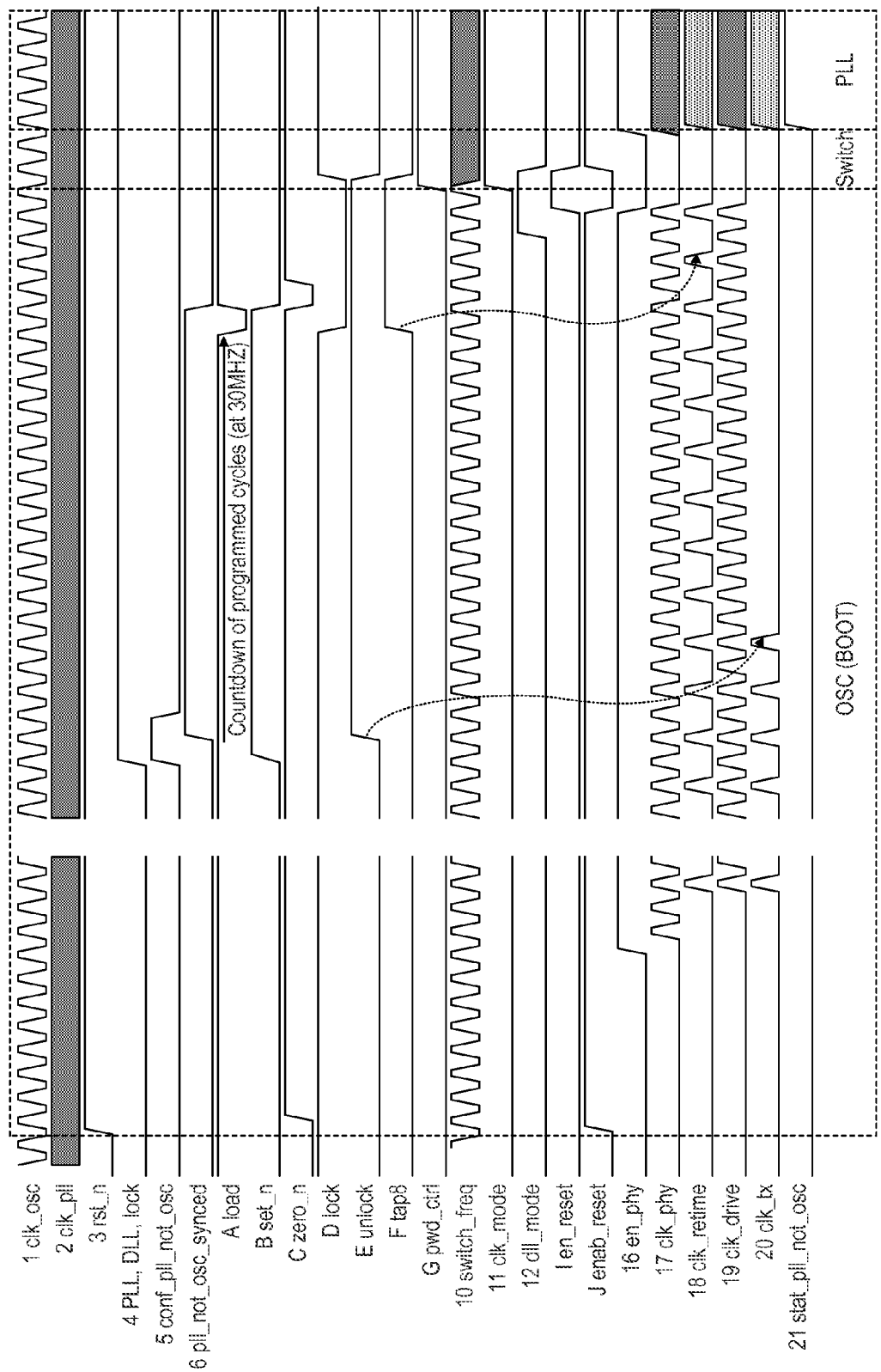
FIG. 12 shows a timing diagram for the second embodiment.
Figure 13:
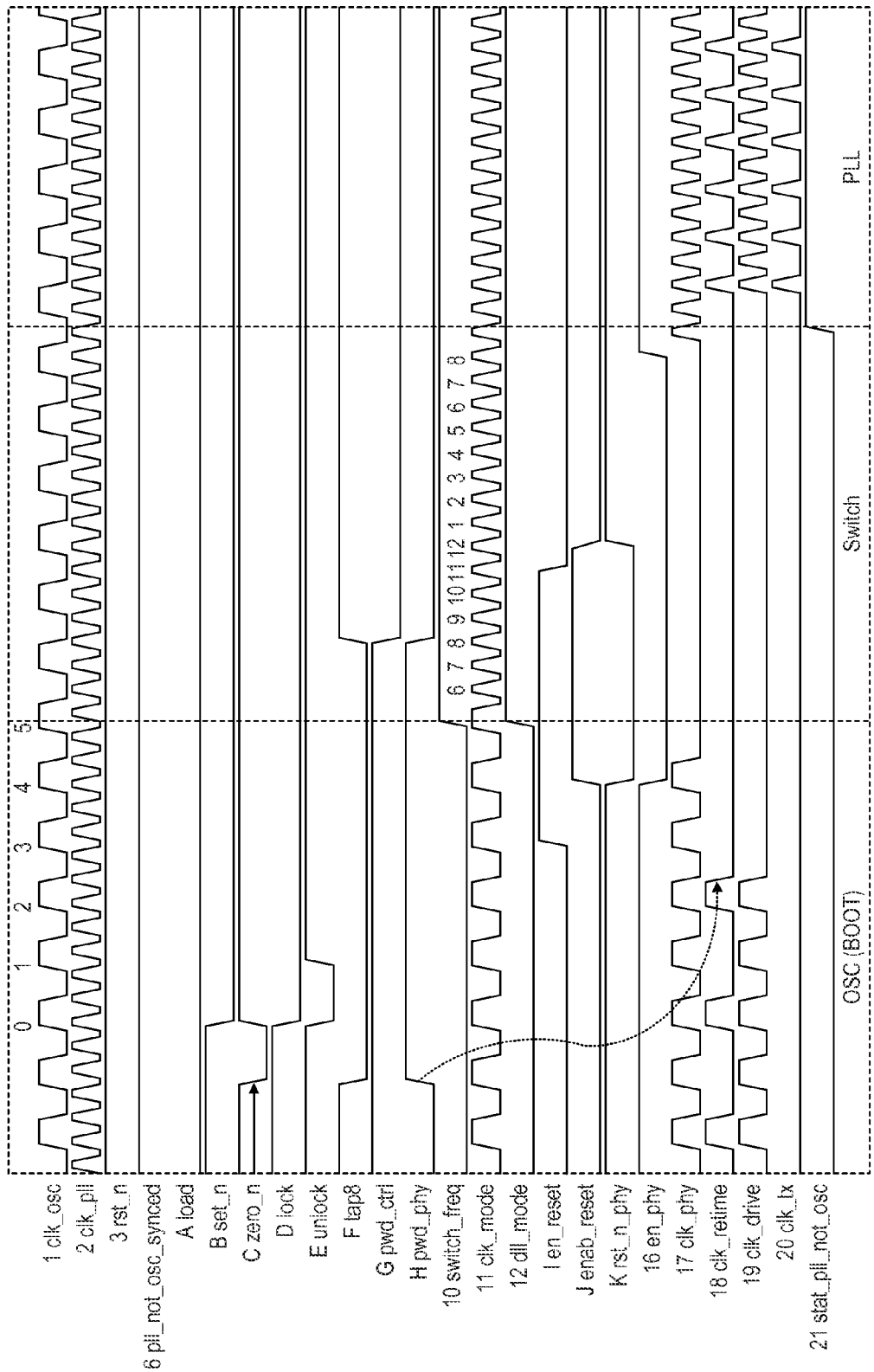
FIG. 13 shows a detailed timing diagram during the frequency switching phase.

Reference is now made to FIGS. 12 and 13 which show timing diagrams for the reset method. The timing diagrams show the change from the oscillator mode to the PLL mode. The Figures show the boot region, the switch region and the PLL region. FIG. 13 shows the switching region in more detail as compared to FIG. 12.

Those signals which are the same as shown in FIGS. 7 and 8 are referenced by the same number and are generally as previously described. These are signal 1 (clk_osc), 2 (clk_pll), 3 (rst_n), 6 (pll_not_osc_synced), 10 (switch_freq), 11 (clk_mode), 12 (dll_mode), 16 (en_phy), 17 (clk_phy), 18 (clk_retime), 19 (clk_drive), 20 (clk_tx) and (stat_pll_not_osc). It should be noted that signals 4 (PLL, DLL lock), 5 (conf_pll_not_osc), 8 (en_sw) and 9 (enab_switch) are not shown in FIG. 10 for space reasons but would be as shown in FIG. 7.

Signal 3, which is system reset rst_n, is deasserted. Subsequently signal E, which is unlock, goes high to bring the counter circuit to its quiescent state with load, set_n and lock at low state and zero_n and unlock in high state. This state persists until the frequency switch is initiated by conf_pll_not_osc and then pll_not_osc_synced going high causing a high-going pulse on signal A, which is load. System reset signal K (rst_n_phy) goes high followed eight cycles later by signal 16 (en_phy) in order to start the clocks and allow the interface to propagate data.

As can be seen the high-going pulse on signal A (load) is applied to the counter which provides signal B which is derived as previously described and is the signal set_n. Signal C is the output of the counter zero_n which provides a low-going pulse the programmed number of cycles later (under the control of the countdown timer). Note the flushing period of the PHY is defined as the time between set_n going high and the zero_n pulse. Signal D is the lock signal in the counter which goes high responsive to load going high and goes low responsive to set_n going low. Signal E (unlock) is the reset input of the flip flop 332. This is provided by the Q output of the flip-flop 330 going low responsive to the pulse on signal zero_n. Signal F is the eighth tap, tap8, of the delay chain 102.

Signal G is the pwd_ctrl signal output by the OR gate 252. This signal goes high when set_n goes high and stays high until tap8 goes high. Signal H is pwd_phy which is the inversion of tap8. When pwd_ctrl goes high, this causes clock clk_tx to the transmitter controller to stop, preventing propagation of data from the TX controller. This can be seen in FIG. 12. The physical transmitter interface continues to run flushing the data to the RX die. After this, the signal pwd_phy going high, timed by the countdown timer, causes the clocks clk retime and clk drive to the transmitter interface to stop. The period between these events is the same as the flushing period of the interface. The physical transmitter interface is then reset. Restarting of the interface is the same as after system reset.

Signal I is the en_reset signal output by the AND gate 105 of the delay chain 1 and provides a high-going pulse at the beginning of the switching period. Signal J is the enab_reset signal which is output by delay chain 1 and provides a high-going pulse delayed by one clock period with respect to en_reset. Signal K is the reset signal rst_n_phy which is output by the AND gate 117. Signal 16 is the signal en_phy. Note the timing of en_reset, enab_reset and rst_n_phy is the same as en_stop, enab_stop and rst_n_stop respectively from the previously described embodiment and en_phy timing is also the same. When rst_n_phy pulses low it resets the transmitter interface; this is the fundamental difference with respect to the first described embodiment.

The frequency switching sequence of this embodiment for switches from PLL to oscillator frequencies is, like the previously described embodiment, the same as the oscillator to PLL case but with each period at a reversal of the frequencies.

In some embodiments, the switching algorithms may be controlled by software. The software may run over the link between the die. In some embodiments, the software and transmitter physical interface configuration traffic may run over the same link between the dies. The software may be used to configure the PLL, and reset/enable the DLL. In some embodiments, the software can monitor the PLL lock, the DLL lock and/or the frequency mode of operation status.

In some embodiments, the number of cycles in each phase of operation is the same when changing from the oscillator frequency to the PLL frequency and vice versa.

Some embodiments may have the advantage of being able to run at BOOT, at the oscillator frequency, then switch to a higher frequency under mainly autonomous control. The circuit or hardware may in some embodiments be such that the software control interface is minimized since the transmitter physical interface itself is handling the frequency switch rather than the controller.

Some embodiments have the ability to switch in and out the PDD delay as a timing component in order to give a fine-tuned timing. This is done via the multiplexer 68 and with the advancement of the clock via multiplexer 56 of FIG. 3. This operation may be done seamlessly in the frequency switch sequence.

In some embodiments, the use of substantially the same bit slice circuitry for the interface signals (for example clock vs. data) may provide good balancing even when the PDD component is switched in and out.

Some embodiments may have the ability to reconfigure PLL/DLL when the system is operating at a low frequency since the DLL sub-system is controlled independently of the main transmitter physical interface. Without this the dataflow would have to be interrupted while the PLL/DLL were being reconfigured. The clock bit slice circuitry can operate without the PDD delay by using the output from the sequencing logic.

Some embodiments allow the elimination of clock glitches that would otherwise corrupt the data propagation by only allowing the local switching of clock sources when the interface is either stopped or reset. This is done by the design of the sequencing of the clock control circuitry as shown in FIG. 4. The use of clock gating logic may eliminate glitches on the stopping and starting of the PHY clocks eg. buffer 112 of FIG. 4 and inside the clock generator.

It should be appreciated that the embodiments described above show the relationship between the different signals. It should be appreciated that the number of cycles of delay in other embodiments may differ from the embodiments shown.

What is claimed is:

1. An apparatus, comprising:
a first clock source;
a second clock source; and
circuitry configured to supply a clock signal to a circuit, said circuitry configured to change the clock signal from one frequency to another different frequency such that no clock signal is supplied when changing from said one frequency to said another different clock frequency;
wherein said circuitry comprises:
a first delay chain clocked at one of said frequency or different frequency and having a plurality of taps;
a logic circuit coupled to the taps of the first delay chain and configured to generate a first control signal indicating to stop use of said frequency and generate a second control signal enabling frequency change for said clock signal; and
a second delay chain clocked at one of said frequency or different frequency and reset in response to said first control signal and having an output configured to generate a third control signal indicating to start use of said different frequency.

2. An apparatus as claimed in claim 1, wherein said second clock source is configured to provide a first frequency clock signal and a second frequency clock signal.

3. An apparatus as claimed in claim 2, wherein said circuitry is configured to change said clock signal supplied from said first frequency clock signal to said second frequency clock signal by stopping the supply of the first clock signal to said circuit, providing a clock signal from said first clock source to said circuit, stopping the supply of the clock signal from said first clock source and providing said second frequency clock signal.

4. An apparatus as claimed in claim 1, wherein said second clock source comprises a phase lock loop.

5. An apparatus as claimed in claim 4, wherein said second clock source is configured to attain lock when said clock signal from the first clock source is being supplied to said circuit.

6. An arrangement as claimed in claim 1, comprising delay locked loop circuitry configured to provide a controllable delay, said delay locked loop circuitry configured to be reconfigured while said circuit uses said first clock.

7. An apparatus as claimed in claim 6, wherein said delay locked loop circuitry comprises a programmable delay through which a clock signal is selectively controlled to pass.

8. An apparatus as claimed claim 1, wherein said circuitry is configured to change a clock signal at said one frequency determined by one of said first and second clock sources to a clock signal at said another frequency determined by the other of said first and second clock sources.

9. An apparatus as claimed in claim 1, wherein said first clock source comprises an oscillator.

10. An apparatus as claimed in claim 1, wherein said circuitry comprises a circuit for transmitting data.

11. An apparatus as claimed in claim 10, wherein said circuitry for transmitting data comprises a plurality of bit slices for respective bits of data and at least one bit slice for a clock to be transmitted with said data, said bit slices being substantially the same.

12. An apparatus as claimed in claim 1, wherein said circuitry comprises gating circuitry configured to receive a clock signal and an enable signal and having an output, said gating circuitry configured to provide said clock signal on an output.

13. An apparatus as claimed in claim 12, wherein said circuitry comprises a delay chain having a plurality of taps and wherein said enable signal is dependent on an output of said delay chain.

14. An apparatus as claimed in claim 1, where said circuitry is configured to retain data when no clock signal is supplied such that said data is present when said clock signal is reapplied.

15. An apparatus as claimed in claim 1, wherein said circuitry is configured to receive a reset signal when no clock signal is supplied, said circuit being configured to be reset when no clock signal is applied.

16. An apparatus as claimed in claim 1, wherein the apparatus is implemented on an integrated circuit die.

17. An apparatus as claimed in claim 16, further comprising a second integrated circuit die coupled for communication with said integrated circuit die.

18. An apparatus as claimed in claim 17, wherein said integrated circuit die comprises a processor and said second integrated circuit die comprises a memory configured to store boot data for said processor.

19. An apparatus as claimed in claim 18, wherein said integrated circuit die is configured to communicate with said second integrated circuit die at a clock frequency dependent on a clock frequency of said first clock circuit during a boot operation.

20. An apparatus, comprising:
a transmit physical interface including a data output and a clock output which is a timing reference for the data output;
a first oscillating circuit configured to generate a first clock signal having a variable frequency;
a second oscillating circuit configured to generate a second clock signal at a fixed frequency; and
a control circuit configured to control operation of the transmit physical interface during a change in frequency of the clock output, said control circuit operable to:
terminate transmit physical interface data output with the clock output derived from the first clock signal;
activate transmit physical interface data output with the clock output derived from the second clock signal;
change frequency of the first clock signal;
terminate transmit physical interface data output with the clock output derived from the second clock signal; and
activate transmit physical interface data output with the clock output derived from the first clock signal at the changed frequency.

21. The apparatus of claim 20, further including a delay lock loop circuit configured to control a phase of the clock output; and
wherein the control circuit is further operable to wait for said delay lock loop circuit to lock on said changed frequency before terminating transmit physical interface data output with the clock output derived from the second clock signal and then activating the transmit physical interface data output with the clock output derived from the first clock signal at the changed frequency.

22. The apparatus of claim 21, wherein said second oscillating circuit is a phase lock look circuit; and
wherein the control circuit is further operable to wait for said delay lock loop circuit and phase lock loop circuit to lock before terminating transmit physical interface data output with the clock output derived from the second clock signal and then activating the transmit physical interface data output with the clock output derived from the first clock signal at the changed frequency.

23. The apparatus of claim 20, where said transmit physical interface is configured to retain data in the absence of the first and second clock signals such that said data is present when one of said first and second clock signal is available.

24. The apparatus of claim 20, wherein said transmit physical interface comprises: a plurality of bit slices configured to store respective bits of data; and at least one bit slice configured to store clock data.

25. A method, comprising:
transmitting data output from a transmit physical interface with a clock output derived from a first clock signal having a variable frequency; and
in response to a need to change a frequency of the clock output:
terminating transmission of data output from the transmit physical interface with the clock output derived from the first clock signal;
activating transmission of data output from the transmit physical interface with the clock output derived from a second clock signal having a fixed frequency;
changing a frequency of the first clock signal;
terminating transmission of data output from the transmit physical interface data output with the clock output derived from the second clock signal; and
activating transmission of data output from the transmit physical interface data output with the clock output derived from the first clock signal at the changed frequency.

26. The method of claim 25, further comprising:
controlling a phase of the clock output with a delay lock loop circuit; and
waiting for said delay lock loop circuit to lock on said changed frequency before terminating transmission of data output from the transmit physical interface data output with the clock output derived from the second clock signal and activating transmission of data output from the transmit physical interface data output with the clock output derived from the first clock signal at the changed frequency.

27. The method of claim 26, further comprising:
generating said second clock signal with a phase lock look circuit; and
waiting for said delay lock loop circuit and phase lock loop circuit to lock before terminating transmission of data output from the transmit physical interface data output with the clock output derived from the second clock signal and activating transmission of data output from the transmit physical interface data output with the clock output derived from the first clock signal at the changed frequency.

* * * * *